United States Patent
Ifuku et al.

(10) Patent No.: US 12,517,054 B2
(45) Date of Patent: *Jan. 6, 2026

(54) DEVICE FOR DIAGNOSING ENVIRONMENTAL STRESS IN PLANTS AND METHOD FOR DIAGNOSING ENVIRONMENTAL STRESS

(71) Applicants: Kyoto University, Kyoto (JP); National University Corporation Kobe University, Kobe (JP); Bunkoukeiki Co., Ltd., Hachioji (JP)

(72) Inventors: Kentaro Ifuku, Kyoto (JP); Yufen Che, Kyoto (JP); Shoko Tsuji, Kyoto (JP); Chikahiro Miyake, Kobe (JP); Takayuki Sohtome, Hachioji (JP)

(73) Assignees: KYOTO UNIVERSITY, Kyoto (JP); NATIONAL UNIVERSITY CORPORATION KOBE UNIVERSITY, Hyogo (JP); BUNKOUKEIKI CO., LTD., Tokyo (JP)

( * ) Notice: Subject to any disclaimer, the term of this patent is extended or adjusted under 35 U.S.C. 154(b) by 304 days.

This patent is subject to a terminal disclaimer.

(21) Appl. No.: 18/036,799

(22) PCT Filed: Nov. 12, 2021

(86) PCT No.: PCT/JP2021/041741
§ 371 (c)(1),
(2) Date: May 12, 2023

(87) PCT Pub. No.: WO2022/102746
PCT Pub. Date: May 19, 2022

(65) Prior Publication Data
US 2024/0019372 A1 Jan. 18, 2024

(51) Int. Cl.
*G01N 21/64* (2006.01)
*G01N 21/31* (2006.01)
(Continued)

(52) U.S. Cl.
CPC ......... *G01N 21/6486* (2013.01); *G01N 21/31* (2013.01); *G01N 21/84* (2013.01);
(Continued)

(58) Field of Classification Search
CPC ..... G01N 2021/635; G01N 2021/8466; G01N 21/31; G01N 21/314; G01N 21/3563;
(Continued)

(56) References Cited

U.S. PATENT DOCUMENTS

| | | | |
|---|---|---|---|
| 6,624,887 B1 | 9/2003 | Kramer et al. | |
| 9,733,179 B1 * | 8/2017 | Bugbee | G01N 21/3563 |
| 2011/0179706 A1 | 7/2011 | Hunt | |

FOREIGN PATENT DOCUMENTS

| | | |
|---|---|---|
| JP | 2005-326241 A | 11/2005 |
| JP | 5881082 B2 | 3/2016 |

(Continued)

OTHER PUBLICATIONS

PCT/JP2021/041741, International Search Report and Written Opinion dated Feb. 1, 2022, 8 pages—Japanese, 6 pages—English.
(Continued)

*Primary Examiner* — Hina F Ayub
(74) *Attorney, Agent, or Firm* — Andrew F. Young, Esq.; NOLTE LACKENBACH SIEGEL

(57) ABSTRACT

The present invention relates to an improved technology for a device that identifies and diagnoses an environmental stress state of plants. An environmental stress diagnosis device comprises a measurement light source 12, an induction light source 14, and a transmitted light detector 18. The measurement light source 12 radiates a first measurement
(Continued)

light ML1 and a second measurement light ML2 to a plant sample S, the induction light source 14 radiates a first photosynthesis inducing light FR and a second photosynthesis inducing light AL to the plant sample S, and the transmitted light detector 18 detects a first transmitted light TL1 and a second transmitted light TL2. The control unit 20 has an analysis circuit 20a and a control circuit 20b. The analysis circuit 20a calculates a light absorption difference between the first transmitted light TL1 and the second transmitted light TL2, and calculates Y(ND) which is a state in which P700 in photosystem I in photosynthesis has been oxidized as a ROS marker (a reactive oxygen species suppression index) for plants by utilizing the light absorption difference. The analysis circuit 20a diagnoses an environmental stress state of plants by utilizing the ROS marker.

12 Claims, 24 Drawing Sheets

(51) Int. Cl.
  *G01N 21/84* (2006.01)
  *G01N 27/403* (2006.01)
  *G01N 33/00* (2006.01)
(52) U.S. Cl.
  CPC ........ *G01N 27/403* (2013.01); *G01N 33/0027* (2013.01); *G01N 2021/8466* (2013.01)
(58) Field of Classification Search
  CPC .... G01N 21/59; G01N 21/6486; G01N 21/84; G01N 27/403; G01N 33/0027; G01N 33/0098
  See application file for complete search history.

(56) References Cited

FOREIGN PATENT DOCUMENTS

| | | |
|---|---|---|
| JP | 2020-05034 A | 6/2020 |
| JP | 2020-95034 A | 6/2020 |
| JP | 2020-189008 | 11/2020 |
| WO | PCT/JP2021/041741 | 11/2021 |

OTHER PUBLICATIONS

Ru Zhang et al: "Photosynthetic electron transport and proton flux under moderate heat stress",Photosynthesis Research ; Official Journal of the International Society of Photosynthesis Research, Springer, Berlin, DE, vol. 100, No. 1, Apr. 3, 2009 (Apr. 3, 2009),pp. 29-43.

Zygadlo A et al:"Photosystem I lacking the PSI-G subunit has a higher affinity for plastocyanin and is sensitive to photodamage", Biochimica Et Biophysica Acta. Bioenergetics, Amsterdam, NL, vol. 1708, No. 2,Jun. 30, 2005 (Jun. 30, 2005),pp. 154-163.

Popova Antoaneta V et al:"Differential temperature effects on dissipation of excess light energy and energy partitioning in lut2 mutant of*Arabidopsis thalianaunder* photoinhibitory conditions", Photosynthesis Research, Springer Netherlands, Dordrecht, NL, vol. 139,No. 1,May 3, 2018(May 3, 2018),pp. 367-385.

Schreiber Ulrich et al:"Measuring P700 Absorbance Changes around 830 nm with a New Type of Pulse Modulation System", Zeitschrift Fuer Naturforschung. C, a Journal of Biosciences., vol. 43, No. 9-10,Oct. 1, 1988(Oct. 1, 1988), pp. 686-698.

Klughammer Christof et al:"Saturation Pulse method for assessment of energy conversion in PS I",PAM Application Notes,Jan. 1, 2008 (Jan. 1, 2008),Retrieved from the Internet: URL:https://www.walz.com/files/downloads/pan/PAN07002.pdf.

EP 21891991,8, European Search Report dated Sep. 25, 2024, 10 pages—English.

Aug. 29, 2018. Japanese Society of Soil Science and Plant Nutrition. Program of 2018 Kanagawa University Meeting. Session VII-6. Internet: <URL: https:// doi.org/10.20710/dohikouen.64.0_205>. p. 205. (Abstracts of the Annual Meetings. Japanese Society of Soil Science and Plant Nutrition). non-official translation (SEJIMA. Takehiro et al. Realization of Pulse Methods Intended for Inherent Reactive Oxygen Generation. Applications to Cultivation Environment Diagnosis: Practical Application of Reactive Oxygen (ROS) Diagnosis Based on P700 Oxidation System.) entire text. all drawings.

Furutani. R. et al. Chapter Five P700 oxidation suppresses the production of reactive oxygen species in photosystem I. Advances in Botanical Research. Sep. 1, 2020. vol. 96. pp. 151-176. Internet: <URL: https://doi.org/10.1016/bs.abr.2020.08.001> entire text. all drawings.

Mattila. H. et al. Singlet oxygen. flavonols and photoinhibition in green and senescing silver birch leaves. Trees. Mar. 16, 2021. vol. 35. pp. 1267-1282. Internet: <URL: https:// doi.org/10.1007/s00468-021-02114-x>, entire text. all drawings.

\* cited by examiner

Y(ND)/V(O2) plot

Data of Y(ND)-V(O2)

(a)

(b)

(a)

(b)

(a)

(b)

(a)

(b)

DEVICE FOR DIAGNOSING ENVIRONMENTAL STRESS IN PLANTS AND METHOD FOR DIAGNOSING ENVIRONMENTAL STRESS

CROSS REFERENCE TO RELATED APPLICATIONS

This application relates to and claims priority from PCT/JP2021/041741 filed Nov. 12, 2021 the entire contents of which are incorporated herein by reference, which in turn claims the priority to Japanese Patent Application No. 2020-189008 filed on Nov. 12, 2020, which is incorporated herein by reference.

FIGURE SELECTED FOR PUBLICATION

FIG. 1

TECHNICAL FIELD

The present invention relates to an improved technology for a device that measures photosynthetic activity, in particular, a device (an environmental stress diagnosis device) that identifies and diagnoses an environmental stress state of plants by measuring the photosynthetic activity.

BACKGROUND OF THE INVENTION

Chlorophyll fluorescence measurement has conventionally been utilized as means for learning the photosynthetic activity of plants. This chlorophyll fluorescence measurement is a technology for mainly detecting the activity of photosystem II which is an initial stage of photosynthesis. In chlorophyll fluorescence measurement, how many electrons are produced from water molecules in a photochemical reaction can be quantitatively identified by monitoring slight light energy (chlorophyll fluorescence) emitted from chlorophyll.

Plants are subject to various types of environmental stress on a daily basis. This environmental stress inhibits photosynthesis of plants, and surplus light energy is accompanied by production of reactive oxygen species (ROS), which may damage the growth of plants.

Specifically, accumulation of ROS in plant cells causes generation of activated nitrogen, lipid peroxide, and activated carbonyl, which resultantly might lead even to damage of cellular functions or withering. For example, cucumber which is a model plant of cucurbitaceous crops and is known as a cold-sensitive crop is subject to growth disorders due to ROS under cold stress. This results in a large cost for temperature management particularly in greenhouse cultivation in winter.

In other words, an ability to find production of ROS in plants and eventually environmental stress in plants in an early stage enables appropriate temperature management in the example of greenhouse cultivation of cucumber. Further, early finding of environmental stress can also contribute to selection of stress tolerant varieties or the like in addition to the cost reduction effect in growing plants and growth evaluation of plants. From such perspectives, research related to early diagnosis of environmental stress in plants has been worked on recently.

Patent Literature 1, for example, discloses a technology related to a plant health diagnosis device that diagnoses health condition of plants by calculating, on a time-dependent changing curve of chlorophyll fluorescence intensity, a smallest local minimum point s (defined as S) appearing after a local maximum point p at which the chlorophyll fluorescence intensity is maximized and a local maximum point m (defined as M) appearing first after the local minimum point s and comparing the values of S and M.

CITATION LIST

Patent Literature

Patent Literature 1: Japanese Patent No. 5881082

SUMMARY OF THE INVENTION

Technical Problem

Patent Literature 1 enables early finding of the health state of plants by performing an analysis under predetermined conditions utilizing the chlorophyll fluorescence measurement. However, the chlorophyll fluorescence measurement is a technology for detecting the activity of the photosystem II which is mainly the initial stage of photosynthesis as described above. In other words, merely with the chlorophyll fluorescence measurement, one is unable to learn how electrons resulting from a photochemical reaction are used in the downstream of electron transfer (photosystem I).

That is, merely with the chlorophyll fluorescence measurement, even a state in which electrons have passed to oxygen and produced reactive oxygen species (ROS) in the photosystem I might be detected as an effective activity of the photosystem II, which leaves room for further improvement for performing an efficient environmental stress diagnosis.

The present invention was made in view of the problems in the background of the invention, and has an object to achieve a diagnosis device for environmental stress in plants that can diagnose an environmental stress state of plants more accurately and earlier than in conventional measurement and non-destructively, and can also be used outdoors, as well as an environmental stress diagnosis method.

Solution to Problem

In order to solve the problems, an environmental stress diagnosis device according to the present invention comprises:
a measurement light source that radiates a measurement light to a plant sample; an induction light source that radiates a photosynthesis inducing light to the plant sample; a sealed chamber that stores the plant sample and allows entry of the measurement light and the photosynthesis inducing light; a transmitted light detector that detects the measurement light transmitted through the plant sample as a transmitted light; and a control unit that receives the transmitted light detected by the transmitted light detector as a measurement signal, the environmental stress diagnosis device diagnosing an environmental stress state of the plant sample, in which
the measurement light source radiates two types of a first measurement light and a second measurement light having different wavelengths to the plant sample,
the induction light source radiates two types of a first photosynthesis inducing light and a second photosynthesis inducing light having different wavelengths to the plant sample, the transmitted light detector detects a transmitted light of the first measurement light as a first transmitted light and detects a transmitted light of the second measurement light as a second transmitted light, the control unit has a control circuit that controls the measurement light source and the induction light source to correspond to the plant sample, and an analysis circuit that analyzes a detection result acquired by the transmitted light detector, the analysis circuit calculates a light absorption difference between the first transmitted light and the second transmitted light, and calculates Y(ND) which is a state in which P700 in photosystem I has been oxidized in photosynthesis as a ROS marker which is a reactive oxygen species suppression index for a plant by utilizing the light absorption difference, and the analysis circuit further diagnoses the environmental stress state of the plant sample by utilizing the ROS marker.

In addition, in the environmental stress diagnosis device according to the present invention, the sealed chamber is equipped with an oxygen concentration detector that measures an oxygen production rate of the plant sample inside the sealed chamber, and the analysis circuit diagnoses the environmental stress state of the plant sample by utilizing a correlation between the ROS marker and the oxygen production rate.

In addition, in the environmental stress diagnosis device according to the present invention, the analysis circuit creates a correlation analysis graph in which a correlation between an oxygen production rate and the ROS marker in the plant sample is plotted with the oxygen production rate on a horizontal axis and the ROS marker on a vertical axis, on the correlation analysis graph, in a case of assuming a region in which a plant sample which is not subject to environmental stress is plotted is a reference region on the correlation analysis graph, a plant sample which is subject to environmental stress and exhibits a normal protective response under the environmental stress is plotted in a protective response region which is a region in which a numeric value of the oxygen production rate is lower and a numeric value of the ROS marker is higher than in the reference region, and a plant sample which is subject to environmental stress but does not exhibit the normal protective response even under the environmental stress is plotted in a damage region which is a region in which the numeric value of the oxygen production rate is lower and the numeric value of the ROS marker is lower than in the reference region, and the analysis circuit determines whether a plot position of the plant sample belongs to the reference region, the protective response region, or the damage region in the correlation analysis graph, and diagnoses the environmental stress state of the plant sample.

In addition, in the environmental stress diagnosis device according to the present invention, the sealed chamber is equipped with all or any of a temperature sensor, a humidity sensor, and an atmospheric pressure sensor as an environment sensor, and the analysis circuit performs correction processing on the oxygen production rate detected by the oxygen concentration detector based on a detection result acquired by the environment sensor.

In addition, in the environmental stress diagnosis device according to the present invention, the oxygen concentration detector is a galvanic cell type oxygen concentration detector.

In addition, the environmental stress diagnosis device according to the present invention is further equipped with a fluorescence detector that detects chlorophyll fluorescence from the plant sample, in which the analysis circuit calculates Y(II) as a photosynthesis rate from a chlorophyll fluorescence detection result acquired by the fluorescence detector, and the analysis circuit diagnoses the environmental stress state of the plant sample by utilizing a correlation between the ROS marker and the Y(II).

In addition, in the environmental stress diagnosis device according to the present invention, the correlation between the ROS marker and the Y(II) is an inverse correlation in which the ROS marker increases when the Y(II) decreases, and drying stress or salt stress in a plant is diagnosed by utilizing the inverse correlation.

In addition, in the environmental stress diagnosis device according to the present invention, the analysis circuit creates a correlation analysis graph in which the correlation between the Y(II) and the ROS marker in the plant sample is plotted with the Y(II) on a horizontal axis and the ROS marker on a vertical axis, on the correlation analysis graph, in a case of assuming a region in which a plant sample which is not subject to environmental stress is plotted is a reference region on the correlation analysis graph, a plant sample which is subject to environmental stress and exhibits a normal protective response under the environmental stress is plotted in a protective response region which is a region in which a numeric value of the Y(II) is lower and the numeric value of the ROS marker is higher than in the reference region, and a plant sample which is subject to environmental stress but does not exhibit the normal protective response even under the environmental stress is plotted in a damage region which is a region in which the numeric value of the Y(II) is lower and the numeric value of the ROS marker is lower than in the reference region, and the analysis circuit determines whether a plot position of the plant sample belongs to the reference region, the protective response region, or the damage region in the correlation analysis graph, and diagnoses the environmental stress state of the plant sample.

In addition, in the environmental stress diagnosis device according to the present invention, the induction light source performs stationary radiation with the first photosynthesis inducing light as continuous radiation, performs pulse radiation with the first photosynthesis inducing light as higher power radiation than the stationary radiation without providing a pausing period after the stationary radiation, thereafter provides a pausing period, performs stationary radiation with the second photosynthesis inducing light, and performs pulse radiation with the second photosynthesis inducing light without providing a pausing period after the stationary radiation, and a radiation time of the pulse radiation is 1 ms to 300 ms.

In addition, in the environmental stress diagnosis device according to the present invention, the sealed chamber is equipped with an exhaled air introduction port for externally introducing exhaled air and an air output port for replacing air inside the sealed chamber.

In addition, in the environmental stress diagnosis device according to the present invention, the environmental stress diagnosis device is operated by utilizing a communication terminal, and an environmental stress diagnosis result is displayed by the communication terminal.

Then, an environmental stress diagnosis method for a plant according to the present invention comprises the steps of:

storing a plant sample in a sealed chamber, and radiating a first measurement light and a second measurement light from a measurement light source to the plant sample and radiating a first photosynthesis inducing light and a second photosynthesis inducing light from an induction light source to the plant sample;

detecting, by a transmitted light detector, the first measurement light and the second measurement light transmitted through the plant sample as a first transmitted light and a second transmitted light, respectively;

calculating, by an analysis circuit, a light absorption difference between the first transmitted light and the second transmitted light, and calculating, by the analysis circuit, Y(ND) which is a state in which P700 in photosystem I has been oxidized in photosynthesis as a ROS marker which is a reactive oxygen species suppression index for a plant by utilizing the light absorption difference; and diagnosing an environmental stress state of the plant by utilizing the ROS marker.

Advantageous Effects of Invention

According to the present invention, transmitted lights through the plant sample are detected by the transmitted light detector and the ROS marker is calculated by the analysis circuit, and an environmental stress diagnosis utilizing this ROS marker is performed. Thus, an environmental stress diagnosis device that can diagnose an environmental stress state of plants more accurately and earlier than in conventional chlorophyll fluorescence measurement can be provided.

As a result, the ROS marker (and the correlation between the ROS marker and the oxygen production rate) measured (and calculated) by the environmental stress diagnosis device according to the present invention can also be utilized as a selection marker for cold stress tolerant varieties, for example.

DESCRIPTION OF EMBODIMENTS

Hereinafter, an environmental stress diagnosis device of the present invention is described with reference to the drawings, but is not limited to the following examples without departing from the purpose of the present invention.

Figure 1:
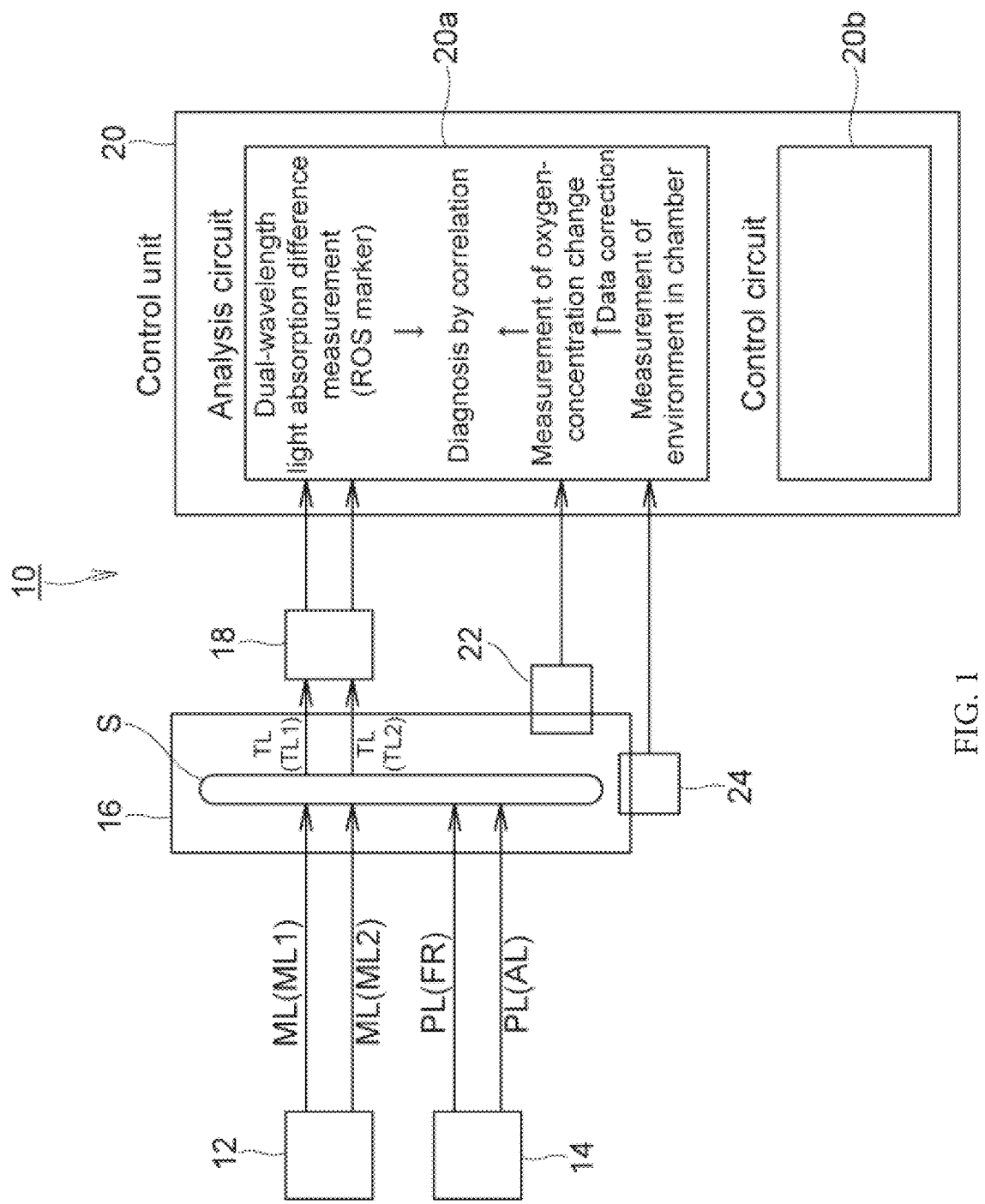
FIG. 1 shows a schematic configuration diagram of an environmental stress diagnosis device according to an embodiment of the present invention.

FIG. 1 shows a schematic configuration diagram of an environmental stress diagnosis device according to an embodiment of the present invention. An environmental stress diagnosis device 10 according to the present embodiment is mainly intended to be used outdoors. That is, the environmental stress diagnosis device 10 is a portable device that can be brought to a field environment, and is brought to a site to directly gauge plants (living leaves) and perform an environmental stress diagnosis. The environmental stress diagnosis device 10 according to the present embodiment can be driven with a power battery of 12 V.

Figure 2A:
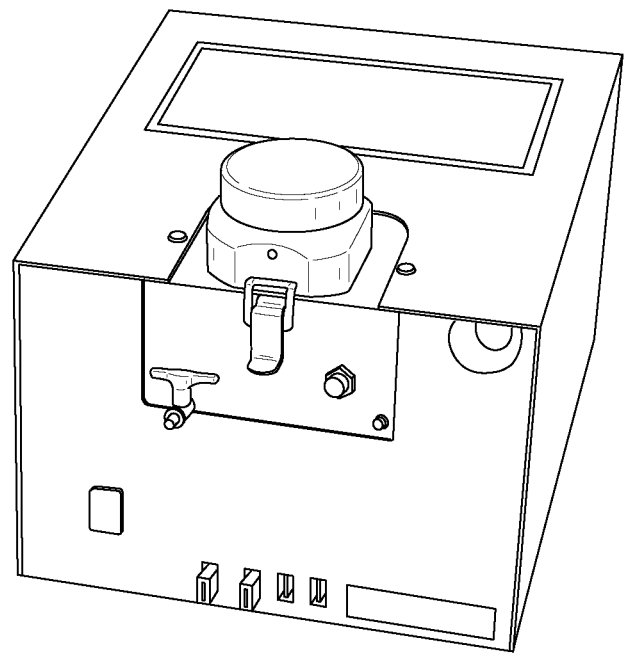
FIG. 2 shows schematic image views of the environmental stress diagnosis device according to the embodiment of the present invention.
Figure 2B:
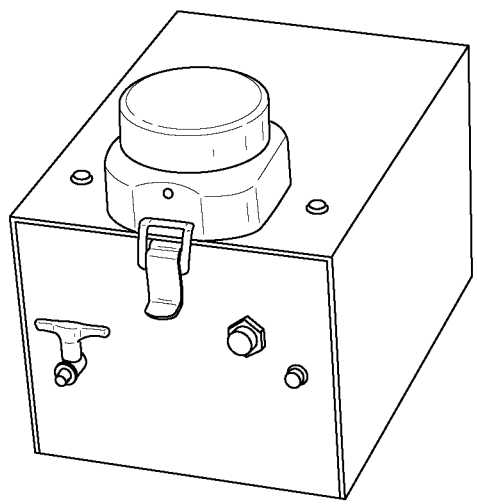

In the present embodiment, an operation display unit can be provided on a portion of a housing in the environmental stress diagnosis device 10, for example, to perform operation of the device and display diagnosis results by the operation display unit (see FIG. 2(*a*)).

In addition, the environmental stress diagnosis device 10 may not comprise the operation display unit (see FIG. 2(*b*)), and operation of the device and display of diagnosis results may be performed by a communication terminal (portable terminal) such as a smartphone or a tablet. In this case, communication between the communication terminal and the environmental stress diagnosis device 10 can be performed through wireless communication (in this case, the environmental stress diagnosis device is equipped with a communication unit).

Although electric components such as a battery and the like are actually required because the environmental stress diagnosis device 10 according to the present embodiment is a portable device, illustration of components and the like other than essential components necessary for an environmental stress diagnosis is omitted in FIG. 1.

The environmental stress diagnosis device 10 shown in FIG. 1 is configured to include a measurement light source 12 that radiates a measurement light ML to a plant sample S, an induction light source 14 that radiates a photosynthesis inducing light PL to the plant sample S, a sealed chamber 16 that stores the plant sample S and allows entry of the measurement light ML and the photosynthesis inducing light PL, a transmitted light detector 18 that detects the measurement light ML (ML1, ML2) transmitted through the plant sample S as a transmitted light TL (TL1, TL2), and a control unit 20 that receives the transmitted light TL detected by the transmitted light detector 18 as a measurement signal (an electric signal).

The sealed chamber 16 is further equipped with an oxygen concentration detector 22 that measures an oxygen production rate (also called an oxygen concentration change) inside the sealed chamber 16, and an environment sensor 24 for identifying an environmental state inside the sealed chamber 16.

The environmental stress diagnosis device 10 according to the present embodiment can simultaneously measure a ROS marker as a reactive oxygen species suppression index and the oxygen production rate as a photosynthetic activity for the plant sample S (a living leaf of a plant) stored in the sealed chamber 16.

The measurement light source 12 radiates two types of a first measurement light ML1 and a second measurement light ML2 having different wavelengths to the plant sample S. In the present embodiment, dual-wavelength light absorption difference measurement is performed by utilizing the first measurement light ML1 and the second measurement light ML2. The measurement light source 12 is configured to include two types of LEDs, for example.

That is, although details will be described later, three states of P700(Y(ND)) in a ground state, P700(Y(NA)) in an excited state, and P700+(Y(ND)) in an oxidized state are present in P700 which is a measurement target. Thus, in order to estimate the amount of Y(ND), a wavelength region that changes depending on Y(ND) is selected as the first measurement light ML1, and a wavelength region that is common to the three states and does not depend on Y(ND) is selected as the second measurement light ML2, thereby acquiring a difference between the first measurement light ML1 and the second measurement light ML2.

In the present embodiment, the first measurement light ML1 has a wavelength of 810 nm or 830 nm, and the second measurement light ML2 has a wavelength of 880 nm or 910 nm. Note that the wavelengths of the first measurement light ML1 and the second measurement light ML2 can be changed as appropriate depending on the type of the plant sample S or measurement.

In the dual-wavelength light absorption difference measurement in the present embodiment, a dual-wavelength light absorption difference waveform can be acquired by subtracting waveform data on a first transmitted light TL1 acquired when the first measurement light ML1 is transmitted through the plant sample S from waveform data on a second transmitted light TL2 acquired when the second measurement light ML2 is transmitted through the plant sample S. In the present embodiment, the ROS marker can be calculated by utilizing this dual-wavelength light absorption difference waveform.

In addition, when the plant sample S is brought into a photosynthetically active state, various parameters such as the ROS marker change with time. At this time, a background of the plant sample S also changes with time in measurement of light absorption (detection of light transmitted through the plant sample S).

Hence, in the present embodiment, the background in measurement can also be corrected by performing the dual-wavelength light absorption difference measurement. That is, the dual-wavelength absorption difference measurement in the present embodiment cancels the time-dependent change of the background and thus can achieve accurate measurement.

A wavelength of 880 nm or 910 nm at which changes through absorption are small and which is close to the wavelength (810 nm or 830 nm) of the first measurement light ML1 is adopted for the second measurement light ML2 in the present embodiment.

The induction light source 14 radiates two types of a first photosynthesis inducing light FR and a second photosynthesis inducing light AL having different wavelengths to the plant sample S. The induction light source 14 is configured to include two types of LEDs, for example. In the present embodiment, the first photosynthesis inducing light FR has a wavelength of 740 nm, and the second photosynthesis inducing light AL has a wavelength of 640 nm. Note that the wavelengths of the first photosynthesis inducing light FR and the second photosynthesis inducing light AL can be changed as appropriate depending on the type of the plant sample S or measurement. For example, the wavelength of the second photosynthesis inducing light AL can also be changed as appropriate in a range from 400 nm to 700 nm.

In the present embodiment, a filter can also be provided between the LED for outputting the first photosynthesis inducing light FR and the sealed chamber 16. By providing the filter, interference between the measurement light ML and the first photosynthesis inducing light FR can be suppressed. Further, in the present embodiment, an optical filter that interrupts the first photosynthesis inducing light FR and AL can also be provided between the sealed chamber 16 and the transmitted light detector 18 (in front of the transmitted light detector 18).

The first photosynthesis inducing light FR and the second photosynthesis inducing light AL are radiated to the plant sample S by combining a continuous radiation (called stationary radiation) and a pulsed radiation (called pulse radiation; SP in FIG. 3) which is higher power radiation than the stationary radiation as shown in FIG. 3.

Specifically, the induction light source 14 stationarily radiates the first photosynthesis inducing light FR as the continuous radiation, performs the pulse radiation as higher power radiation than the stationary radiation without providing a pausing period after the stationary radiation, thereafter provides a pausing period and stationarily radiates the second photosynthesis inducing light AL, and performs the pulse radiation without providing a pausing period after the stationary radiation.

Figure 3:
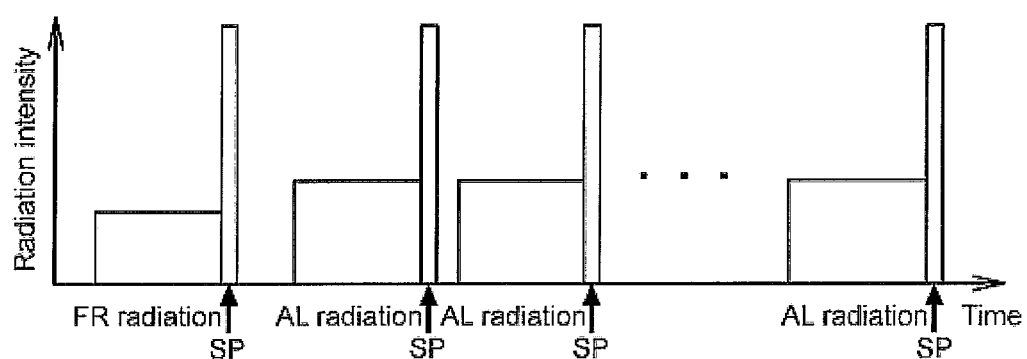
FIG. 3 shows a schematic operation explanatory diagram of an induction light source according to the embodiment of the present invention.

Thereafter, the induction light source 14 radiates only the second photosynthesis inducing light AL to the plant sample S as in FIG. 3. Note that radiation of the first photosynthesis inducing light FR can also be performed at the end of the present measurement, for example. In addition, the stationary radiation in the present embodiment is performed for approximately 5 seconds to 60 seconds both for the first photosynthesis inducing light FR and the second photosynthesis inducing light AL. Note that the time for this stationary radiation may be 60 seconds or more depending on the type of the plant sample S to be measured.

In addition, in the present embodiment, radiation (stationary radiation and pulse radiation) of the first photosynthesis inducing light FR may be performed twice or more. By performing radiation of the first photosynthesis inducing light FR twice or more, an idling state of the plant sample S, which will be described later, can be acquired more stably.

The amount of light (photon flux density) of the first photosynthesis inducing light FR in the stationary radiation in the present embodiment is approximately 30 $\mu molm^{-2}s^{-1}$ to 70 $\mu molm^{-2}s^{-1}$. In addition, the amount of light (photon flux density) of the second photosynthesis inducing light AL in the stationary radiation is approximately 100 $\mu molm^{-2}s^{-1}$ to 22000 $\mu molm^{-2}s^{-1}$.

Figure 4:
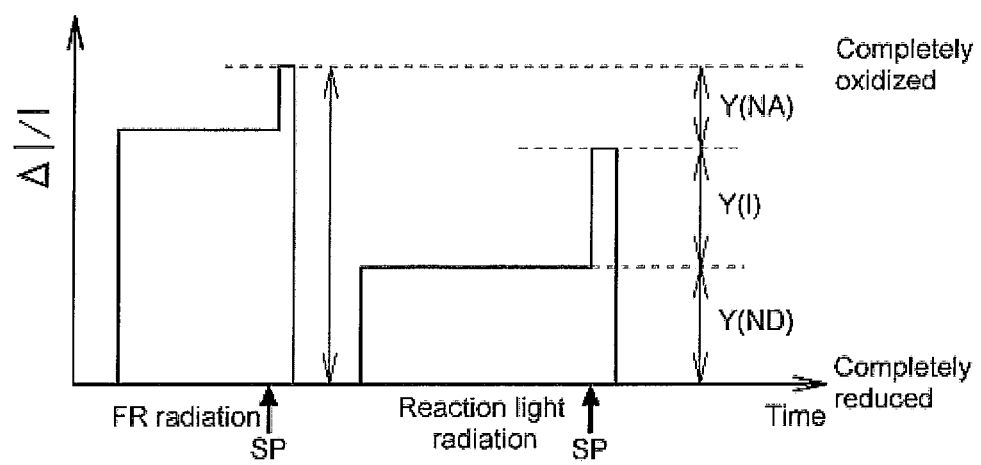
FIG. 4 shows a schematic image diagram of P700 light absorption change acquired by radiation of photosynthesis inducing lights in the present embodiment.

FIG. 4 shows a schematic image diagram of P700 light absorption change acquired by radiation of the photosynthesis inducing light in the present embodiment. As shown in FIG. 4, the stationary radiation of the first photosynthesis inducing light FR is performed for bringing the photosystem I in the plant sample S into a stationary operation state (idling state) (to trigger a photosynthesis cycle in the plant sample S because the inside of the sealed chamber 16 is dark). Moreover, the pulse radiation of the first photosynthesis inducing light FR is performed for identifying the total amount of P700 in the photosystem I (the total amount of Y(I), Y(NA), and Y(ND) indicating the respective states in P700, which will be described later).

In the present embodiment, the pulse radiation of the first photosynthesis inducing light FR (740 nm) to the plant sample S enables only the photosystem I to be driven without driving the photosystem II (or the photosystem I can be driven faster than driving of the photosystem II).

Specifically, the photosystem I in the plant sample S is brought into the stationary operation state by the stationary radiation of FR. The pulse radiation of FR at this time brings P700 into a completely oxidized state. That is, P700 is brought into the completely oxidized state before the photosynthesis cycle in the photosystem I operates, and the total amount of P700 in the photosystem I can be identified by gauging this state.

In addition, if the first photosynthesis inducing light FR has a wavelength of 700 nm or greater, only the photosystem I can be driven. In this manner, in the present embodiment, the total amount of P700 can be appropriately identified by driving only the photosystem I by the pulse radiation of FR.

The stationary radiation of the second photosynthesis inducing light AL (radiation of reaction light in FIG. 4) is performed for bringing the photosynthesis cycle (the photosynthesis cycle that operates both the photosystem II and the photosystem I) in the plant sample S into the idling state and identifying Y(ND) which is a state in which P700 has been oxidized. That is, the second photosynthesis inducing light AL plays a role of quasi-solar light radiation.

Then, the pulse radiation of the second photosynthesis inducing light AL is performed for identifying P700(Y(I)) that is reduced and in the ground state. In addition, calculation of a difference between the total amount of P700 acquired by the pulse radiation of FR and Y(I)+Y(ND) that can be identified by the radiation of AL enables P700*(Y(NA)) which is a state absorbing light energy to be identified.

A radiation time of the pulse radiation SP is preferably 1 ms to 300 ms, more preferably 50 ms to 250 ms, and still more preferably 200 ms. In addition, the amount of light (photon flux density) of the pulse radiation, for example, is approximately 5000 $\mu molm^{-2}s^{-1}$ to 15000 $\mu molm^{-2}s^{-1}$. The environmental stress diagnosis device 10 according to the present embodiment can accurately measure the oxidized state (the ROS marker) of P700 in the photosystem I by this characteristic inducing light radiation technology.

The sealed chamber 16 stores the plant sample S as a measurement target. In the present embodiment, a living leaf cut into approximately a 16 mm square can be utilized as the plant sample S (the plant sample S is measured non-destructively). Although illustration is omitted in FIG. 1, the sealed chamber 16 is equipped with a light guide window at a position where the measurement light ML (ML1, ML2) from the measurement light source 12 and the photosynthesis inducing light PL (FR, AL) from the induction light source 14 can enter the sealed chamber 16.

In addition, in the present embodiment, a light guide can also be provided between both the measurement light source 12 and the induction light source 14 and the sealed chamber 16.

By providing the light guide, the measurement light ML and the photosynthesis inducing light AL are radiated along the same optical path, and uniform radiation to the measurement sample S can be achieved.

Similarly, a light guide can also be provided between the sealed chamber 16 and the transmitted light detector 18, for example. By providing the light guide at this position, the transmitted light TL can be detected efficiently. Specifically, by providing the light guide, the transmitted light detector 18 can detect the transmitted light TL 20% to 30% more than in the conventional measurement.

The volume of the sealed chamber 16 in the present embodiment is preferably approximately 2 ml to 20 ml, more preferably 5 ml to 10 ml, and particularly preferably 8 ml.

When the sealed chamber 16 has such a volume, measurement can be performed without exhausting $CO_2$ for approximately about 20 minutes to 30 minutes from a saturated $CO_2$ state.

Here, the saturated $CO_2$ state in the present description means a state in which the carbon dioxide concentration has reached approximately 1% to 4%. In the present embodiment, oxygen concentration measurement (or measurement of the oxygen production rate) is performed having the carbon dioxide concentration inside the sealed chamber 16 set at approximately 1% to 2%. In addition, the sealed chamber 16 according to the present embodiment has a columnar shape, but may have other shapes such as a quadrangular prism shape or a hemispherical shape, for example.

Figure 5:
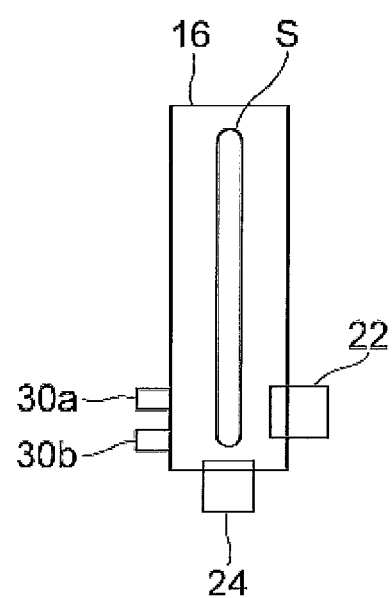
FIG. 5 shows a schematic explanatory diagram of an exhaled air introduction port and an air output port according to the embodiment of the present invention.
Figure 6A:
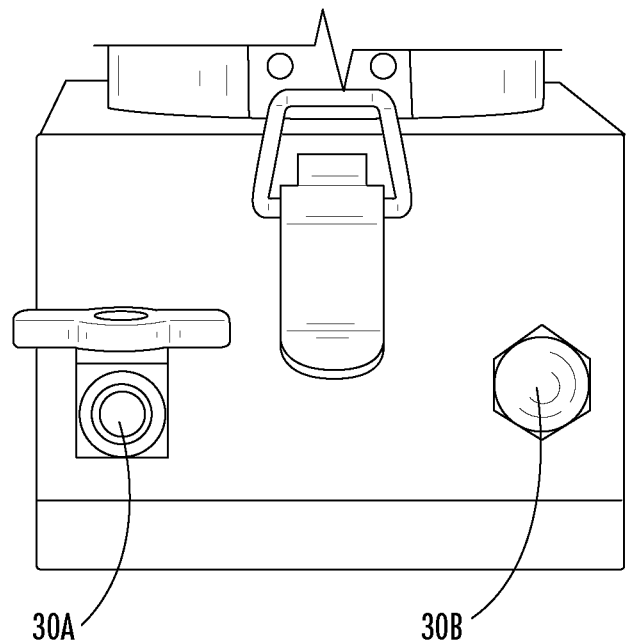
FIG. 6 shows schematic image views of the exhaled air introduction port and the air output port according to the embodiment of the present invention.
Figure 6B:
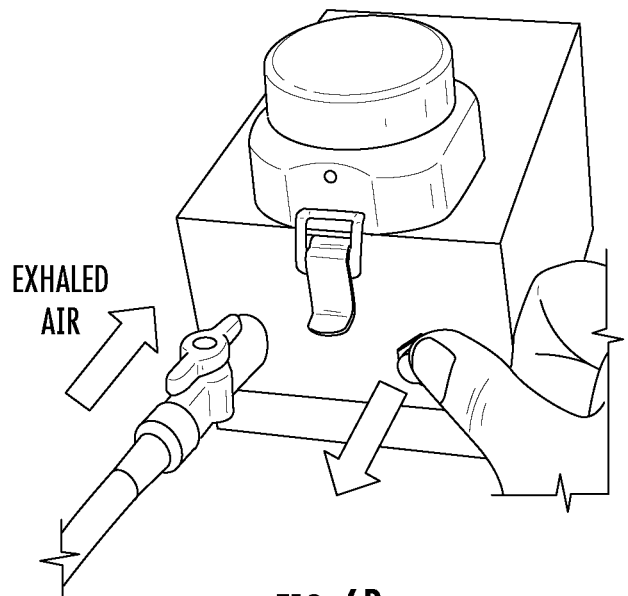

Further, in the present embodiment, the sealed chamber 16 can also comprise an exhaled air introduction port 30a for introducing human exhaled air (beath) (or for connection to the sealed chamber 16 from the outside of the device) as shown in FIG. 5 and FIG. 6(*a*), for example.

The sealed chamber 16 can easily create the saturated $CO_2$ state inside the sealed chamber 16 when human exhaled air is introduced through this exhaled air introduction port 30a (FIG. 6(*b*)). By creating this saturated $CO_2$ state, the maximum photosynthetic ability can be gauged upon measurement (particularly upon outdoor measurement). That is, the maximum photosynthetic performance can be evaluated in the present embodiment, thus enabling highly accurate measurement of the oxygen concentration which does not depend on the state of pores, offers high reproducibility, and facilitates comparative evaluation to be performed.

In addition, in the present embodiment, by putting a sodium bicarbonate solution, for example, into the sealed chamber 16, carbon dioxide can be produced in the sealed chamber 16. For example, in the present embodiment, the oxygen concentration measurement can also be performed by impregnating a cloth or felt with the sodium bicarbonate solution and putting the cloth or felt into the sealed chamber 16.

On the other hand, when the exhaled air introduction port 30a is closed without letting in exhaled air, the sealed chamber 16 can be maintained in a sealed state, so that a low $CO_2$ state can be created resultantly, and a minimum photosynthetic ability can also be gauged.

Additionally, the sealed chamber 16 can also comprise an air output port 30b as shown in FIG. 5 and FIG. 6(*a*). In the present embodiment, by providing this air output port 30b, air in the sealed chamber 16 can easily be replaced even in the state in which the plant sample S is stored in the sealed chamber 16. Positions at which the exhaled air introduction port 30a and the air output port 30b are provided are not particularly limited.

The oxygen concentration detector 22 provided in the sealed chamber 16 measures the photosynthetic activity of the plant sample S inside the sealed chamber as the oxygen production rate. The oxygen concentration detector 22 preferably is a galvanic cell type oxygen concentration detector, for example.

In the present embodiment, the use of the galvanic cell type (also called an oxygen electrode type) oxygen concentration detector 22 eliminates the need for a power source for driving the oxygen concentration detector 22 in outdoor use, and an effect of improving maintenance properties can be expected.

Further, the galvanic cell type oxygen concentration detector detects oxygen by means of the voltage, and thus has no concentration-dependent detection limit, so that a condition in which the $CO_2$ concentration is higher (approximately 40000 ppm) can be set. If the condition in which the $CO_2$ concentration is high can be set, $CO_2$ can be supplied rapidly into a leaf(the inside of the plant sample S) regardless of an open/close state of pores, which enables rapid stationary-state photosynthetic activity measurement.

In a case of detecting the oxygen concentration through general gas exchange measurement, for example, a constant flow rate of air has to be continuously flowed into the sealed chamber 16. This means that air is always blown onto the plant sample S. That is, plants vulnerable to dryness such as aquatic plants may lose moisture due to continuous air blowing during the gas exchange measurement, and the plant sample S may be damaged.

On the other hand, in the galvanic cell type oxygen concentration detector 22, the inside of the sealed chamber 16 can be maintained in the sealed state and in a highly wet state. Thus, moisture of the plant sample S will not be lost during the oxygen concentration measurement.

The environment sensor 24 is provided for measuring an environmental state (environmental information) inside the sealed chamber 16. All or any of a temperature sensor, a humidity sensor, and an atmospheric pressure sensor, for example, can be utilized as the environment sensor 24. In addition, the environment sensor 24 is not limited to the temperature sensor, the humidity sensor, and the atmospheric pressure sensor, but may be a sensor for measuring another environmental parameter.

As described above, the environmental stress diagnosis device 10 according to the present embodiment is mainly intended to be used outdoors. It is needless to say that in an outdoor field site, respective conditions of temperature, humidity, atmospheric pressure, and the like are different depending on a district in question or environment. The present embodiment can perform data correction (correction processing) on the oxygen production rate of the plant sample S inside the sealed chamber 16 by detecting the temperature, humidity, and atmospheric pressure inside the sealed chamber 16 in outdoor use under different environments.

Specifically, data correction on the oxygen production rate of the plant sample S inside the sealed chamber 16 can be performed by utilizing a correction factor γ for correcting the oxygen concentration because the oxygen concentration changes due to time-dependent variation of the humidity, temperature, and atmospheric pressure.

$$\gamma = P(t)/P(t0) \times [\{(-4 \times 10^{-7}) \times T^2(t) - (2 \times 10^{-6}) \times T(t)\} \times H(t) + 1] \quad \text{[Expression 1]}$$

H(t): a humidity sensor value [%] at a gauging time t

T(t): a temperature sensor value [° C.] at the gauging time t

P(t): a humidity sensor value [hPa] at the gauging time t t0: a time at the time of calibration In the present embodiment, the oxygen concentration $O_2$ can be calculated with the following expression by utilizing this correction factorγ.

$$O_2[\mu\text{mol } O_2] = K(t_0) \times Vs(t) \times \gamma(t) \quad \text{[Expression 2]}$$

Vs(t): a voltage signal [V] of the oxygen sensor at the gauging time t $K(t_0)$: a conversion coefficient between the oxygen concentration and the voltage signal at the time of calibration Further, the oxygen production rate $V(O_2)$ can be calculated with the following expression.

$$V(O_2)[\mu\text{mol } O_2/m^2 \cdot s] 10^4/A \times K(t_0) \times d/dt\{Vs(t) \times \gamma(t)\} \quad \text{[Expression 3]}$$

A: leaf area[$cm^2$]

The transmitted light detector 18 detects the first measurement light ML1 and the second measurement light ML2 transmitted through the plant sample S as the transmitted light TL. Specifically, the transmitted light detector 18 detects a transmitted light of the first measurement light ML1 as the first transmitted light TL1 and a transmitted light of the second measurement light ML2 as the second transmitted light TL2. A PIN photodiode, for example, can be utilized as the transmitted light detector 18 according to the present embodiment (in general, two PIN photodiodes are necessary for detecting TL1 and TL2, respectively). In addition, in the present embodiment, TL1 and TL2 can also be detected with one PIN photodiode.

The control unit 20 has an analysis circuit 20a that analyzes detection results acquired by the transmitted light detector 18 and the oxygen concentration detector 22, and a control circuit 20b that controls the measurement light source 12 and the induction light source 14 to correspond to the plant sample S. A microprocessor or FPGA, for example, can be utilized for the analysis circuit 20a and the control circuit 20b. The analysis circuit 20b performs a data analysis and an environmental stress diagnosis for plants which are characteristic in the present embodiment.

Next, a flow of measurement of the plant sample S (and an environmental stress diagnosis) performed by the environmental stress diagnosis device 10 according to the present embodiment is described. The first measurement light ML1 and the second measurement light ML2 output from the measurement light source 12 reach the plant sample S positioned inside the sealed chamber 16. At this time, the intensity of the measurement light ML (ML1, ML2) is automatically adjusted by the control unit 20 (the control circuit 20b) to have the same signal intensity in conformity with the type of the plant sample S (the measurement light ML is automatically adjusted to enable suitable transmission measurement).

At the start of measurement, measurement in a dark state is performed without radiating the photosynthesis inducing light PL (FR, AL) to the plant sample S. Note that the measurement in the dark state can also be omitted in the present embodiment. Thereafter, the first photosynthesis inducing light FR and the second photosynthesis inducing light AL are radiated to the plant sample S together with the first measurement light ML1 and the second measurement light ML2.

When the photosynthesis inducing light PL (FR, AL) is radiated, the plant sample S is brought into a photosynthetically active (photochemical reaction) state. Then, the first measurement light ML1 and the second measurement light ML2 radiated to the plant sample S are transmitted through the plant sample S, and the first transmitted light TL1 and the second transmitted light TL2 transmitted through the plant sample S are detected by the transmitted light detector 18. The first transmitted light TL1 and the second transmitted light TL2 as detected are sent to the analysis circuit 20a of the control unit 20 as measurement signals (electric signals).

At this time, the oxygen concentration detector 22 detects the oxygen production rate of the plant sample S inside the sealed chamber 16, and an acquired detection result is sent to the analysis circuit 20a. Similarly, the environment sensor 24 detects environmental information (such as temperature, humidity, and atmospheric pressure) inside the sealed chamber 16, and an acquired detection result is sent to the analysis circuit 20a.

The analysis circuit 20a performs an analysis based on the detection results. Specifically, the analysis circuit 20a calculates a light absorption difference between the first transmitted light TL1 and the second transmitted light TL2 (the dual-wavelength absorption difference gauging). Thereafter, by utilizing this light absorption difference, the analysis circuit 20a calculates Y(ND) which is the state in which P700 in the photosystem I in photosynthesis has been oxidized as the ROS marker which is the reactive oxygen species suppression index for plants.

In addition, the oxygen production rate acquired by the oxygen concentration detector 22 is subjected to correction processing based on the environmental information acquired by the environment sensor 24. This correction processing on the oxygen production rate is particularly effective upon outdoor measurement in which various environmental states are assumed.

Then, the analysis circuit 20a analyzes a correlation between the ROS marker and the oxygen production rate (also called a correlation analysis result or a correlation analysis graph), and performs an environmental stress diagnosis for plants by utilizing the acquired correlation analysis result.

Figure 7:
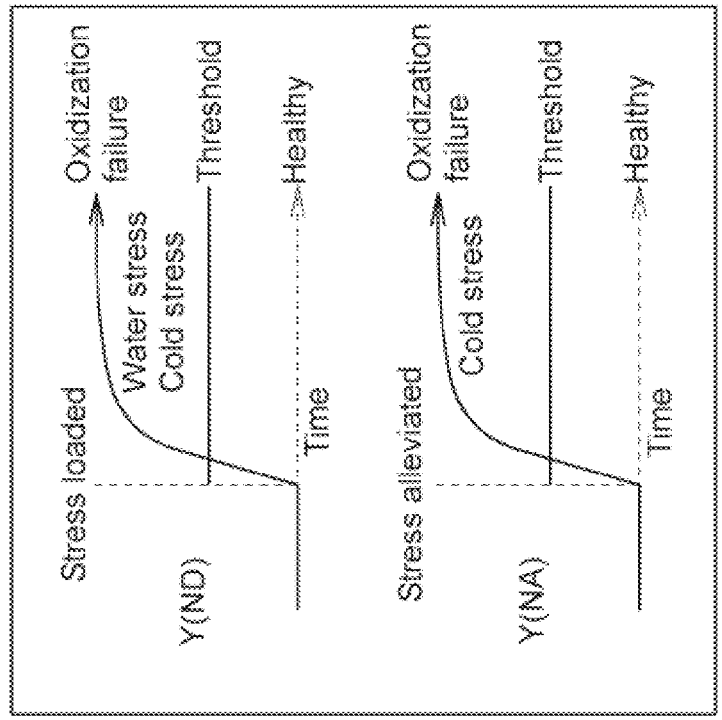
FIG. 7 shows an example of an environmental stress correlation according to the embodiment of the present invention.
Figure 7:
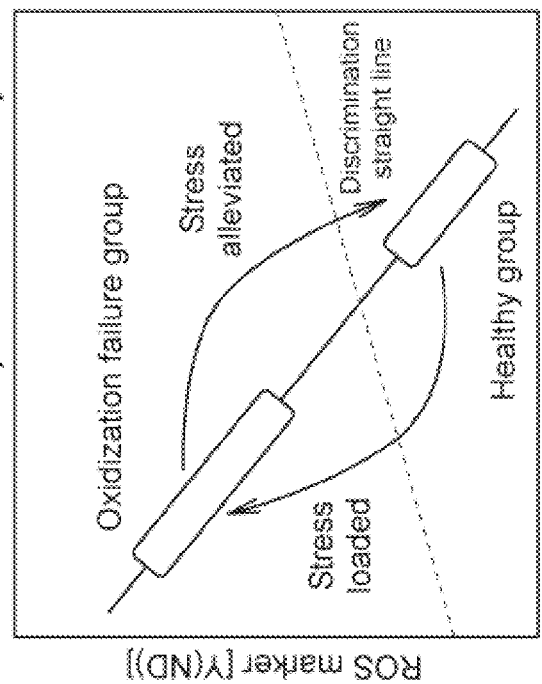

Comparison of this correlation analysis result with environmental stress correlation data (also called an oxidation failure diagnosis manual) stored in the analysis circuit 20a in advance as shown in FIG. 7, for example, enables an accurate and early diagnosis of the environmental stress state of plants (such as whether the plants are subject to environmental stress or not, or the degree of environmental stress). The environmental stress diagnosis in the present embodiment is performed generally in the flow as described above.

Regarding ROS Marker (Reactive Oxygen Species Suppression Index) Here, the ROS marker in the present embodiment is described. The environmental stress diagnosis device 10 according to the present embodiment diagnoses environmental stress in plants more accurately and earlier than in the conventional measurement by utilizing a correlation between the ROS marker and the oxygen production rate (photosynthetic activity). That is, although an environmental stress diagnosis for plants has conventionally been performed only with the photosynthetic activity in the photosystem II or the like, the present embodiment also analyzes the state of P700 in the photosystem I further in addition to the photosystem II (or the oxygen production rate) to perform a diagnosis.

Figure 8:
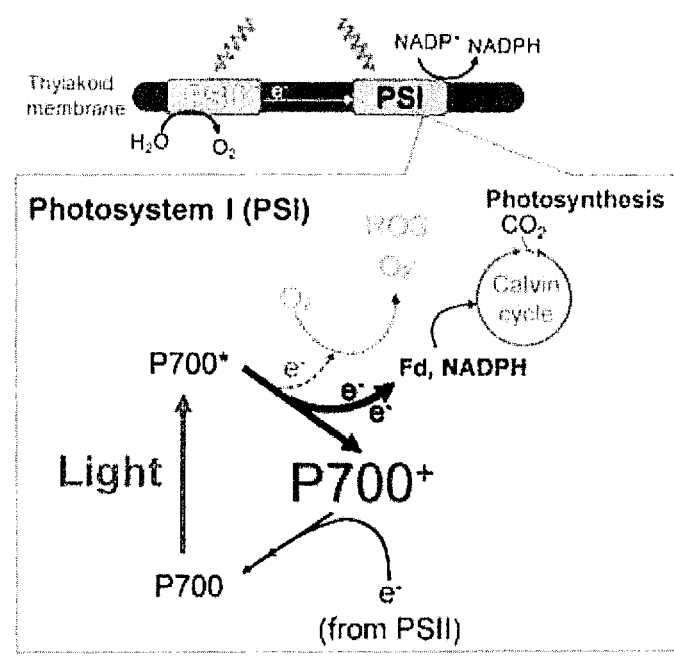
FIG. 8 shows a schematic explanatory diagram of an induction principle of a ROS marker (Y(ND)).

FIG. 8 shows a schematic explanatory diagram of an induction principle of the ROS marker (Y(ND)) according to the present embodiment. When exposed to environmental stress, $CO_2$ fixation through photosynthesis is suppressed in plants. Recent research has revealed that production of reactive oxygen species (ROS) can be avoided by appropriately suppressing supply of electrons from the photosystem II (also called PSII).

In plants, P700 (reaction center chlorophyll of the photosystem I) takes three states of P700(Y(I)) having been reduced and being in the ground state, P700*(Y(NA)) which is the state absorbing light energy (an excited state), and P700+(Y(ND)) which is the state having emitted light energy to be oxidized, and has a relation of Y(I)+Y(NA)+Y(ND)=1.

When P700 is in the state of Y(I) or Y(NA) having electrons, the risk of ROS production increases. On the other hand, when P700 is in the state of Y(ND) having no electrons, ROS production is suppressed. In other words, whether ROS production is suppressed in plants can be determined from an abundance ratio of Y(ND), that is, the environmental stress state in plants can be identified non-destructively and early.

Specifically, when electrons from the photosystem II is supplied, P700 in the photosystem I (also called PSI) is oxidized to be P700+. By detecting this P700+(Y(ND)), the danger of ROS production due to photosynthesis deterioration can be detected in an early stage. In the present embodiment, this (Y(ND)) is called the ROS marker as the reactive oxygen species suppression index.

Regarding Correlation Between ROS Marker and Oxygen Production Rate

Next, a correlative relationship between the ROS marker (Y(ND)) and the oxygen production rate (photosynthetic activity) according to the present embodiment is described. As described above, the environmental stress diagnosis device 10 according to the present embodiment comprises the oxygen concentration detector 22 together with the transmitted light detector 18, and calculates the correlation between the ROS marker and the oxygen production rate by the analysis circuit 20a, so that an environmental stress diagnosis for plants can be performed more accurately and earlier than in the conventional measurement.

Figure 9:
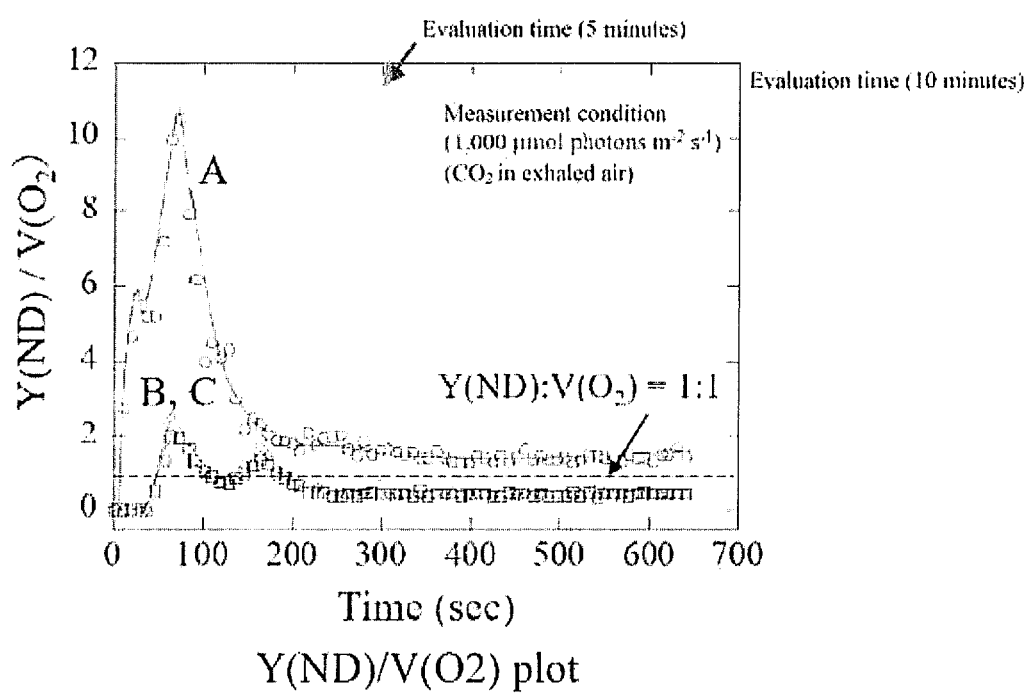
FIG. 9 shows an example of relationship between the ROS marker and an oxygen production rate in the present embodiment.

FIG. 9 shows an example of relationship between the ROS marker and the oxygen production rate $V(O_2)$. FIG. 9 shows results of measuring and analyzing plant samples in respective fields of a field A (in which a plant (wheat) subject to environmental stress is grown; A in FIG. 9), a field B (in which a plant (wheat) not subject to environmental stress is grown; B in FIG. 9), and a field C (in which a plant (wheat) not subject to environmental stress is grown; C in FIG. 9).

As shown in the drawing, in the field A in which the plant subject to environmental stress is grown, $Y(ND)/V(O_2)$ has a large numeric value. On the other hand, in the field B and the field C in which the plants not subject to environmental stress are grown, this numeric value is smaller than in the field A. In this manner, by identifying the relationship between the ROS marker (Y(ND)) and the oxygen production rate ($V(O_2)$), the environmental stress state of the plants can be diagnosed accurately.

Figure 10:
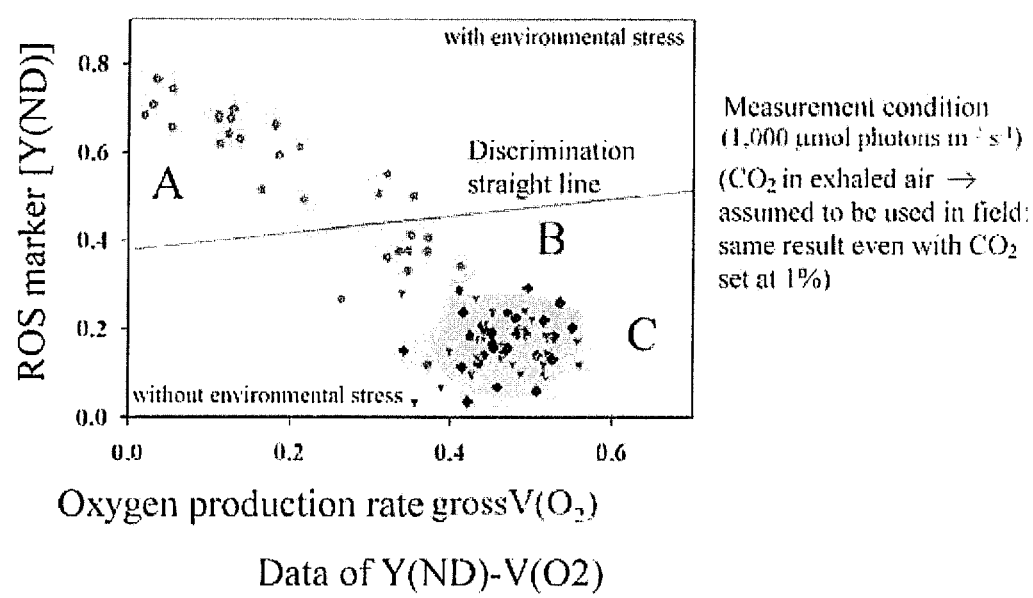
FIG. 10 shows an image diagram of correlation between the ROS marker and the oxygen production rate in the present embodiment.

In addition, FIG. 10 shows an image diagram of the correlation between the ROS marker and the oxygen production rate in the present embodiment. In FIGS. 10, A, B, and C indicate A (the field A), B (the field B), and C (the field C) in FIG. 9. A straight line at the center of FIG. 10 is a discrimination straight line for discriminating whether plants are subject to environmental stress or not.

As shown in FIG. 10, it is understood that measurement results of the field A (in which the plant subject to environmental stress is grown) concentrate on the upper side of the discrimination straight line (diagnosed as being subject to environmental stress), whilst measurement results of the field B and the field C concentrate on the lower side of the discrimination straight line (diagnosed as not being subject to environmental stress). In other words, FIG. 10 indicates that an accurate environmental stress diagnosis result is acquired by utilizing the correlation between the ROS marker and the oxygen production rate.

Figure 11:
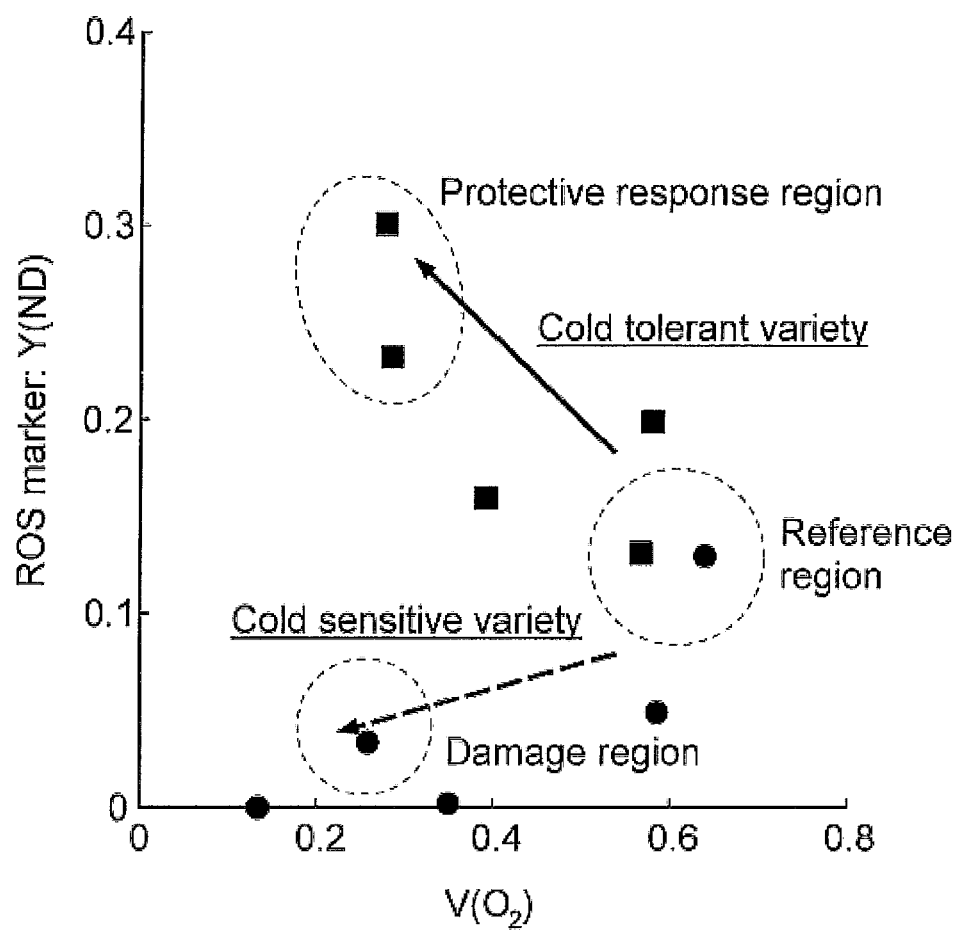
FIG. 11 shows a comparative image diagram (a correlation analysis graph) of a cold tolerant variety and a cold sensitive variety in the correlation between the ROS marker and the oxygen production rate.

Then, FIG. 11 shows a comparative image diagram (a correlation analysis graph) of a cold tolerant variety and a cold sensitive variety in the correlation between the ROS marker and the oxygen production rate. FIG. 11 shows a state of each of the cold tolerant variety and the cold sensitive variety after chilling treatment. Here, the chilling treatment in the present description represents a state in which a plant has been exposed to a cold state (0° C. to 10° C.) for an hour to five hours. In addition, FIG. 11 represents states in which five hours have elapsed after this chilling treatment.

As shown in FIG. 11, the cold tolerant variety has a normal protective response when subject to environmental stress. Specifically, it is understood that when the cold tolerant variety is subject to environmental stress, the numeric value of the oxygen production rate (V(O2)) decreases, and at the same time, the numeric value of ROS marker Y(ND) increases.

On the other hand, it is understood that when the cold sensitive variety is subject to environmental stress, the numeric value of the oxygen production rate decreases and the numeric value of the ROS marker also decreases. It can be said that this suggests damage caused by the reactive oxygen species (ROS). In addition, not only the cold sensitive variety but also plants exposed to environmental stress for a long time and became unable to make the normal protective response, for example, have a result similar to the result of the cold sensitive variety in FIG. 11.

That is, in the correlation analysis graph shown in FIG. 11, in a case of assuming that a region in which a plant sample which is not subject to environmental stress is plotted is a reference region on the correlation measurement graph, a plant sample (the cold tolerant variety) which is subject to environmental stress and exhibits the normal protective response under the environmental stress is plotted in a region (called a protective response region) in which the numeric value of the oxygen production rate is lower and the numeric value of the ROS marker is higher than in the reference region.

On the other hand, a plant sample which is subject to environmental stress but does not exhibit the normal protective response even under the environmental stress (the cold sensitive variety or a plant exposed to environmental stress for a long time and became unable to make the normal protective response) is plotted in a region (called a damage region) in which the numeric value of the oxygen production rate is lower and the numeric value of the ROS marker is lower than in the reference region.

Then, the analysis circuit 20a according to the present embodiment can determine whether a plot position of the plant sample S belongs to the reference region, the protective response region, and the damage region in the correlation analysis graph (or which of the regions the plot position of the plant sample S is close to), and diagnose an environmental stress state of the plant sample S.

Figure 12:
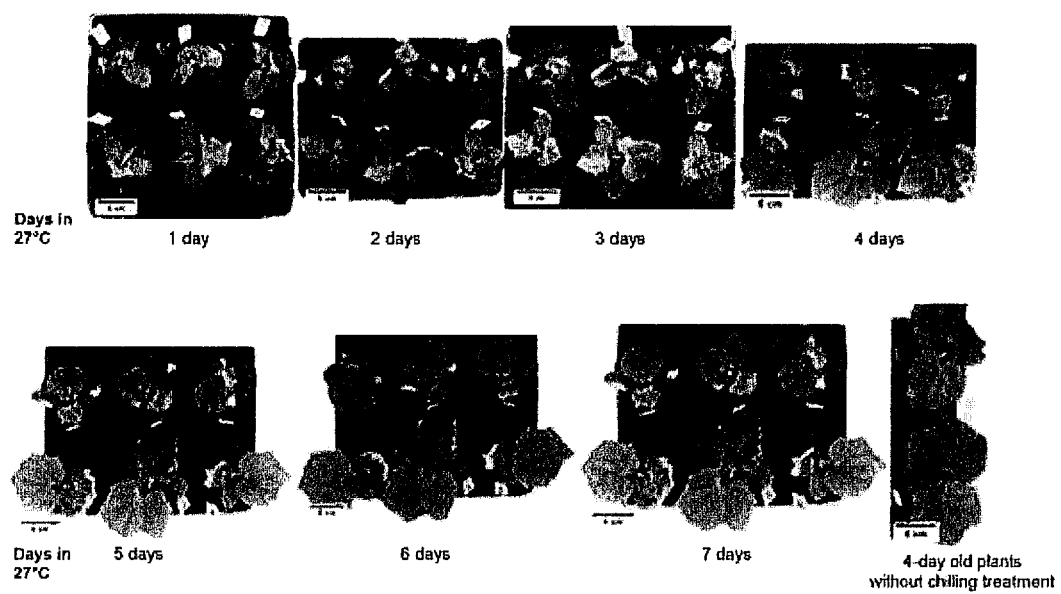
FIG. 12 shows a comparative example of an inter-variety difference between the cold tolerant variety and the cold sensitive variety.

For example, when a plant after the chilling treatment is returned to an optimum temperature as shown in FIG. 12, it is understood that growth of the cold sensitive variety (top) is obviously delayed from the cold tolerant variety (bottom). In other words, by detecting and evaluating the ROS marker under a cold stress environment, an inter-variety difference in tolerance to chilling injury can also be compared in addition to the degree of chilling injury.

In this manner, according to the present invention, the transmitted light through the plant sample S stored inside the sealed chamber 16 (the ROS marker being calculated in the analysis circuit 20a) and the oxygen production rate are simultaneously gauged by utilizing the oxygen concentration detector 22 together with the transmitted light detector 18, and further, the environmental stress diagnosis utilizing the correlation between the ROS marker and the oxygen production rate is performed by the analysis circuit 20a. Thus, the environmental stress diagnosis device 10 that can diagnose an environmental stress state of plants more accurately and earlier than in the conventional chlorophyll fluorescence measurement can be provided.

In addition, although the diagnosis device for environmental stress in plants has been described in the present embodiment, an environmental stress diagnosis can be performed more accurately and earlier than in the conventional measurement by performing steps similar to those of the present device, for example.

Specifically, a step of storing a plant sample in the sealed chamber, and radiating the first measurement light and the second measurement light from the measurement light source to the plant sample and radiating the first photosynthesis inducing light and the second photosynthesis inducing light from the induction light source to the plant sample is performed first. Thereafter, a step of detecting the first measurement light and the second measurement light transmitted through the plant sample as the first transmitted light and the second transmitted light, respectively, by the transmitted light detector and detecting the oxygen production rate of the plant sample inside the sealed chamber by the oxygen concentration detector is performed.

Then, a step of calculating a light absorption difference between the first transmitted light and the second transmitted light by the analysis circuit, and calculating Y(ND) which is a state in which P700 in photosystem I has been oxidized in photosynthesis as the ROS marker which is the reactive oxygen species suppression index for a plant utilizing the light absorption difference by the analysis circuit is performed. Finally, a step of diagnosing an environmental stress state of the plant utilizing the correlation between the ROS marker and the oxygen production rate is performed. Therefore, the environmental stress diagnosis can be performed more accurately and earlier than in the conventional measurement.

The environmental stress diagnosis device 10 according to the present embodiment mainly measures the ROS marker and the oxygen production rate, and in addition, can also measure chlorophyll fluorescence, for example. By analyzing a chlorophyll fluorescence measurement result together with the correlation between the ROS marker and the oxygen production rate in this manner, a further accurate environmental stress diagnosis can be performed. In a case of providing the environmental stress diagnosis device 10 according to the present embodiment with a function of measuring chlorophyll fluorescence, a 450-nm LED, for example, can also be utilized as a light source.

Modification

Figure 13:
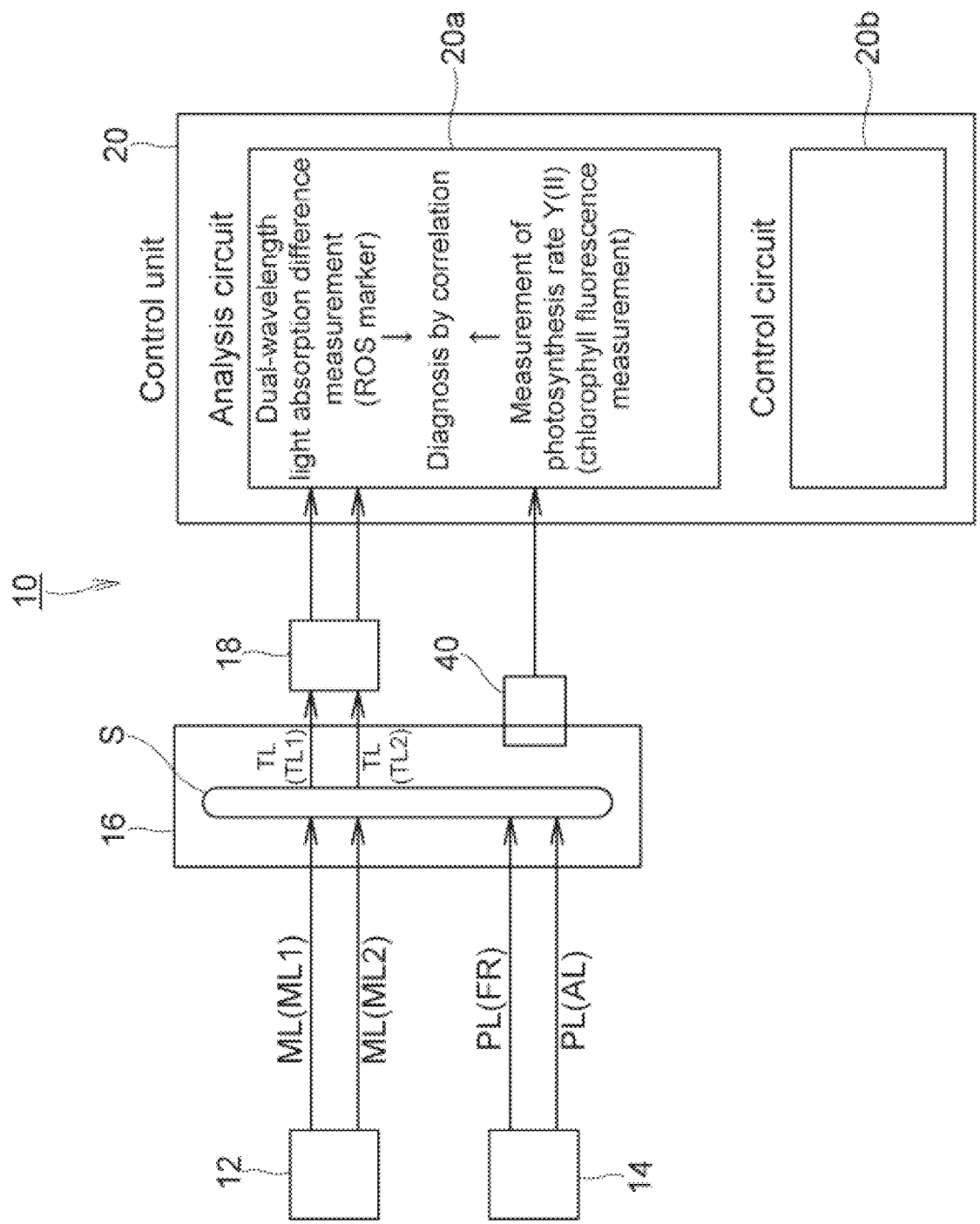
FIG. 13 shows a schematic configuration diagram of an environmental stress diagnosis device according to a modification of the present invention.

FIG. 13 shows a modification of the environmental stress diagnosis device according to the present embodiment. In the present modification, a fluorescence detector 40 that detects chlorophyll fluorescence is provided instead of the oxygen concentration detector 22 (and the environment sensor 24) in FIG. 1, and Y(II) as the photosynthesis rate is measured by the fluorescence detector 40.

Specifically, in the present modification, the analysis circuit 20a shown in FIG. 13 calculates Y(II) as the photosynthesis rate from a chlorophyll fluorescence detection result acquired by the fluorescence detector 40. Note that in this case, measurement is performed upon bringing the inside of the sealed chamber 16 into the saturated $CO_2$ state. The analysis circuit 20a then diagnoses the environmental stress state of the plant sample S by utilizing the correlation between the ROS marker and Y(II). For example, drying stress or salt stress in plants can be learned by utilizing the correlation between the ROS marker and Y(II).

Hereinafter, a drying stress experiment and a salt stress experiment utilizing the present modification is described.

FIG. 14 to FIG. 18 show results of the drying stress experiment using tomato as the plant sample. The drying stress experiment was performed under natural light in a glass greenhouse (at 20° C. to 30° C. or greater, for example). Six pots in which the soil water content is controlled and six pots in which the soil water content is in a dry state were prepared. The soil water content, the ROS marker, and Y(II) were measured with time, and the controlled pots and the pots in the dry state were compared. The soil water content was measured with SM150KIT (SMi50T (soil moisture sensor)+HH150 (indicator)) made by Delta-T Device Ltd.

Figure 14:
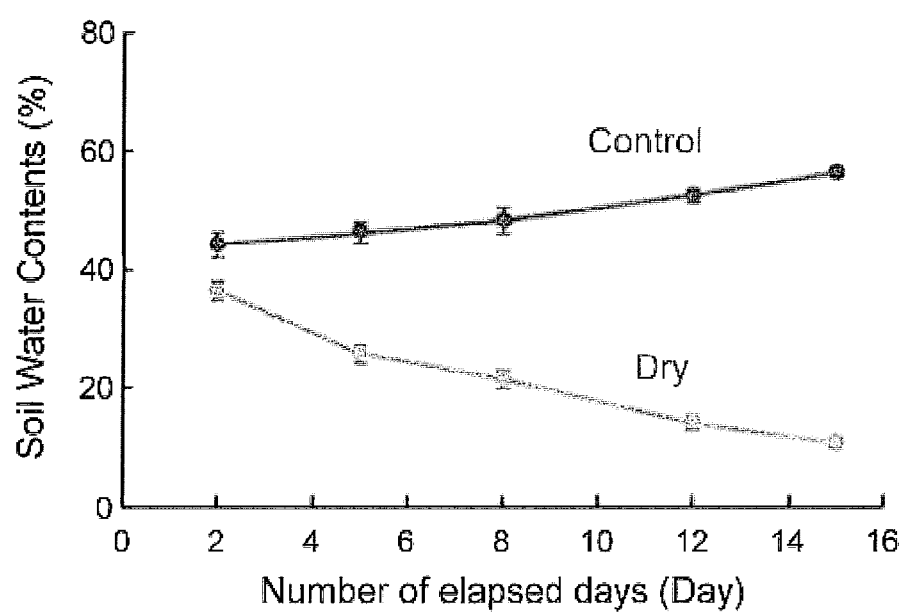
FIG. 14 shows transitions of soil water content in association with the number of elapsed days in a drying stress experiment.
Figure 15:
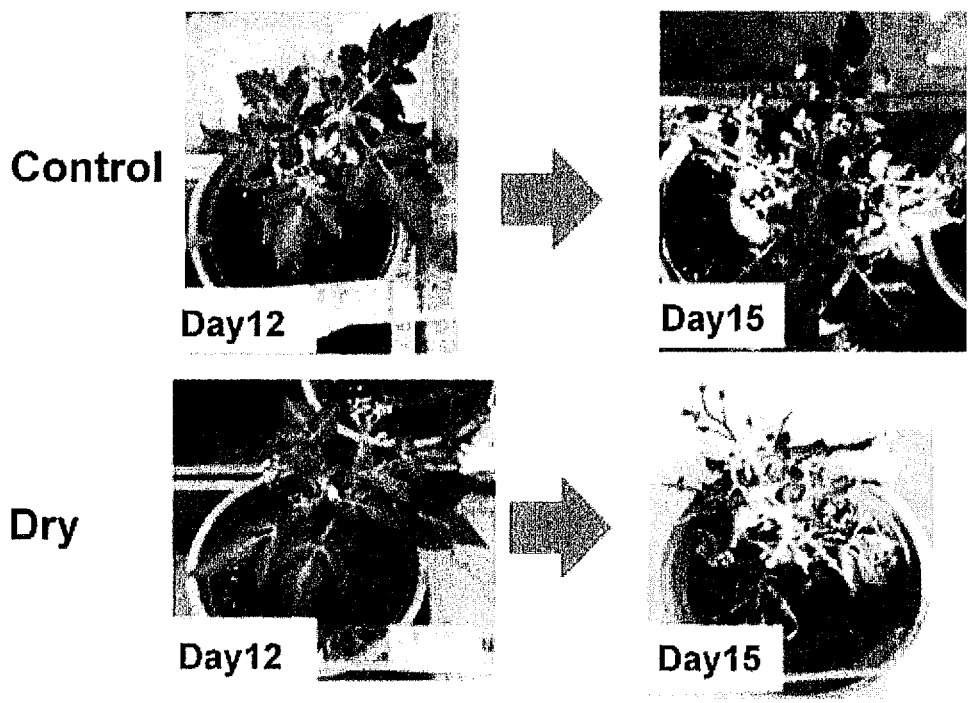
FIG. 15 shows appearances of a plant (tomato) after drying treatment.

As shown in FIG. 14, the soil water content decreased in association with drying treatment, while the plant (tomato) looked healthy until Day 12 when the value of the soil water content reached about 20% (Dry in FIG. 15). Then, as shown in FIG. 15, an abrupt wilt of leaves was observed on Day 15 when the soil water content reached around 10%.

Figure 16:
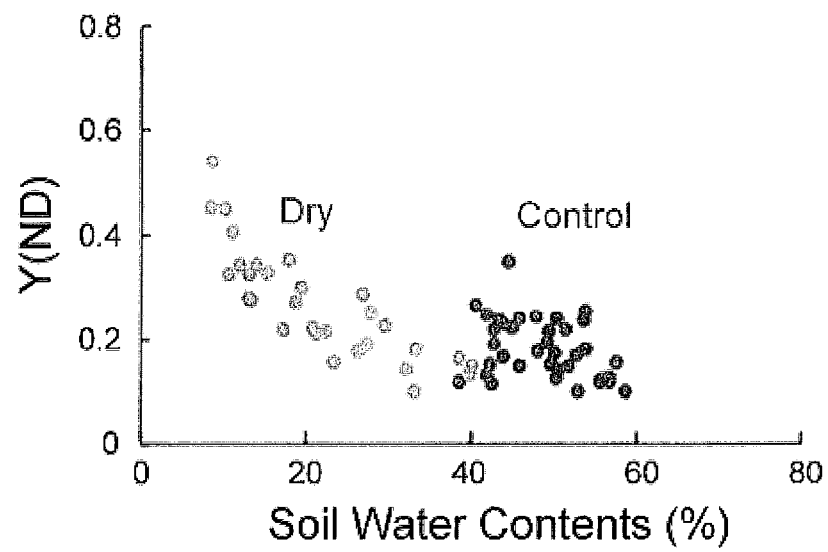
FIG. 16 shows relationships between soil water content and each of Y(ND) and Y(II).
Figure 16:
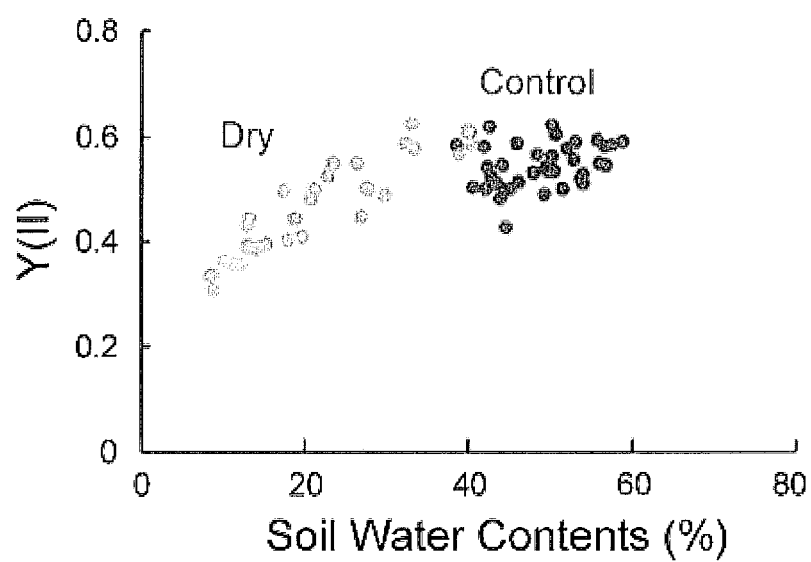

In addition, as shown in FIG. 16, it is understood that, in the pots in the dry state, Y(ND) as the ROS marker increased (FIG. 16(a)) and Y(II) as the photosynthesis rate decreased (FIG. 16(b)) in association with the decrease in the soil water content. That is, it is understood that the ROS marker and Y(II) have an inverse correlation relationship in which when one increases, the other decreases. In addition, because Y(ND) as the ROS marker increased in association with the decrease in Y(II) as the photosynthesis rate in this inverse correlation relationship, it is considered that the result in FIG. 16 is an indication of the protective response in FIG. 11.

Figure 17:
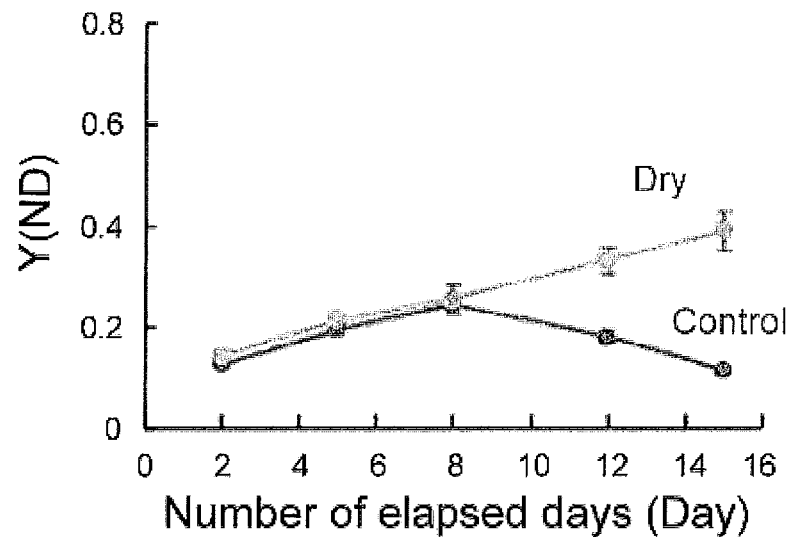
FIG. 17 shows relationships between the number of elapsed days and each of Y(ND) and Y(II).
Figure 17:
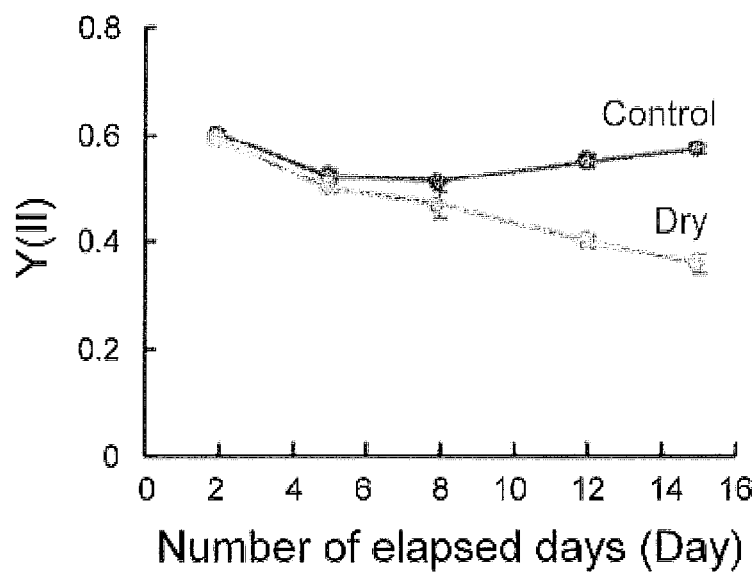
Figure 18:
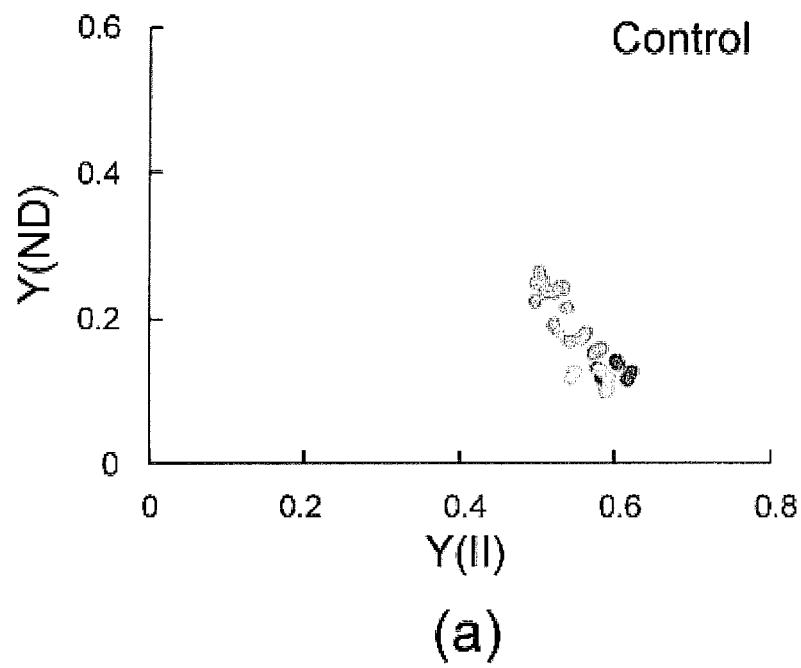
FIG. 18 shows correlative relationships between Y(ND) and Y(II) in the drying stress experiment.
Figure 18:
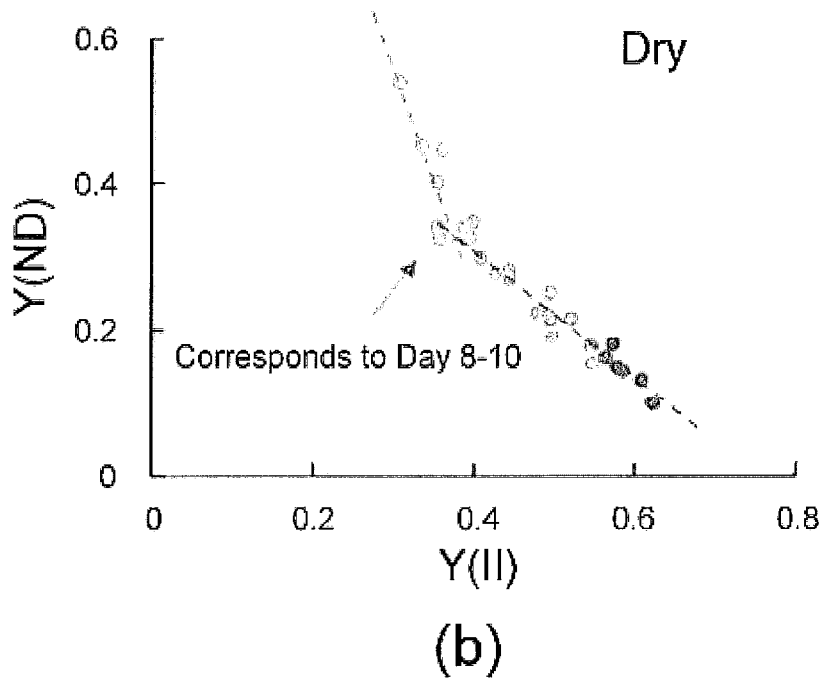

Additionally, as shown in FIG. 17 and FIG. 18, in the pots in the dry state (Dry) in the present drying stress experiment, a point (around Day 8) at which the value of Y(ND) significantly rose relative to the value of Y(II) was recognized. That is, the present drying stress experiment suggests some change in moisture physiological response at this timing around Day 8 (moisture or drying stress can be detected at a stage much earlier than a stage at which a visible symptom appears).

FIG. 19 to FIG. 22 show results of the salt stress experiment using tomato as the sample plant. The salt stress experiment was performed under natural light in a glass greenhouse (at 20° C. to 30° C. or greater, for example) similarly to the drying stress experiment. Four of each of salt-stressed pots having NaCl concentrations of 50 mM, 100 mM, and 250 mM were prepared to be compared.

Figure 19:
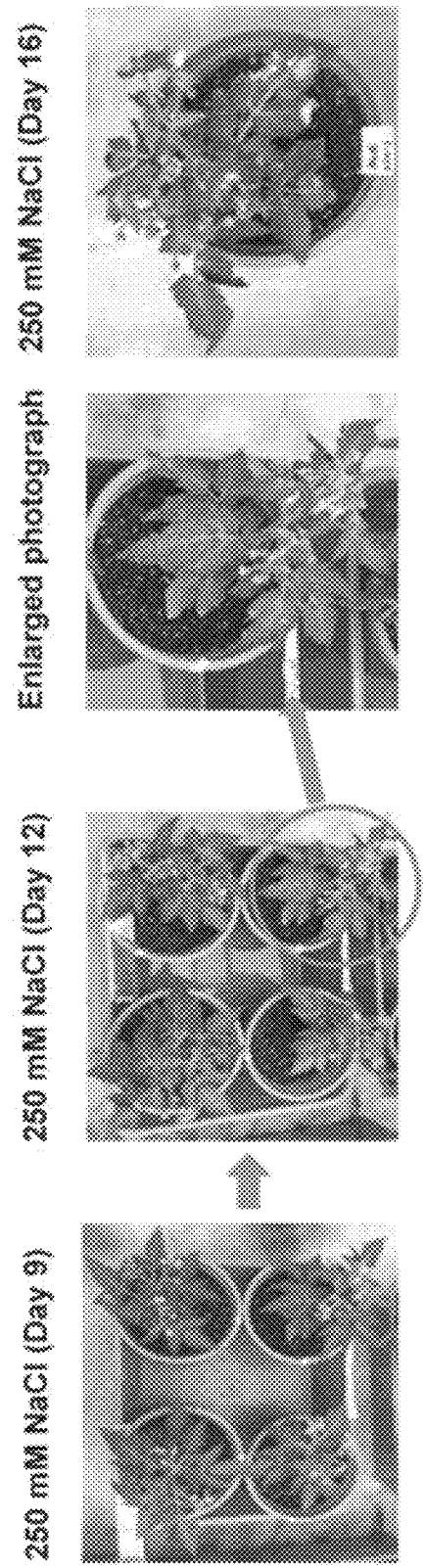
FIG. 19 shows appearances of a plant (tomato) in association with the number of elapsed days in a salt stress experiment.
Figure 20:
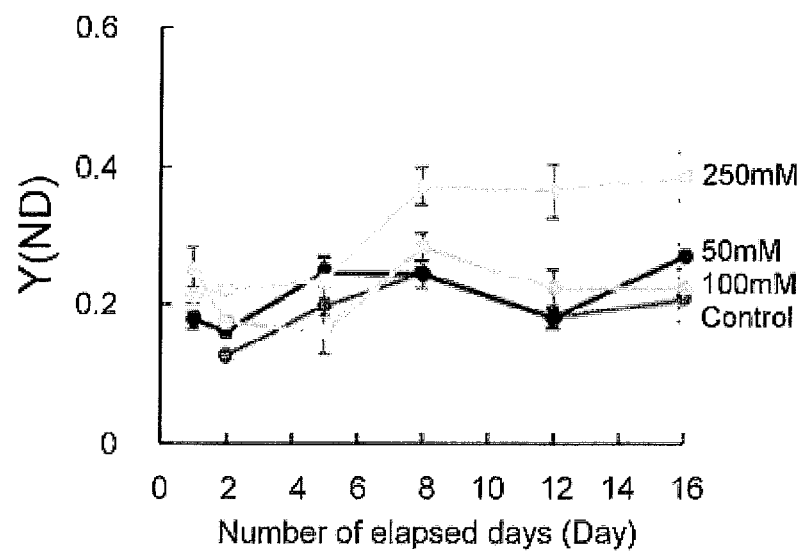
FIG. 20 shows relationships between the number of elapsed days and each of Y(ND) and Y(II) at respective salt concentrations.
Figure 20:
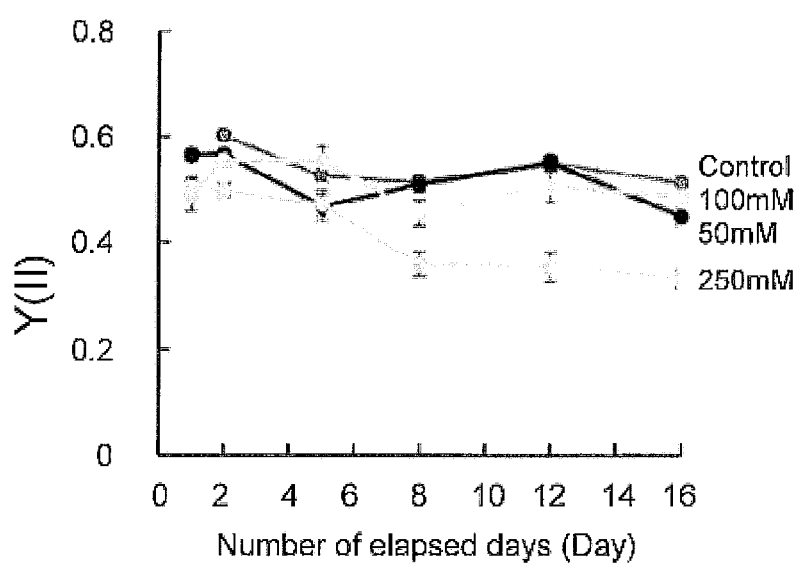

In the present salt stress experiment, the pots treated to have the NaCl concentration of 50 mM and 100 mM were not greatly affected in appearance of leaves, but some individuals were slightly smaller than the controlled pots in terms of growth on Day 16 (illustration is omitted). As shown in FIG. 19, the pots having the NaCl concentration of 250 mM were healthy until Day 9, but a symptom such as browning of leaves was recognized around Day 12, and noticeable injury was observed on Day 16.

In addition, according to FIG. 20(a), it is understood that Y(ND) as the ROS marker in the pots having the NaCl concentration of 250 mM started increasing on Day 8 after the salt stress treatment, and, according to FIG. 20(b), Y(II) as the photosynthesis rate started decreasing on Day 8 after the salt stress treatment (salt stress can be detected at a stage much earlier than a stage at which a visible symptom appears).

Figure 21:
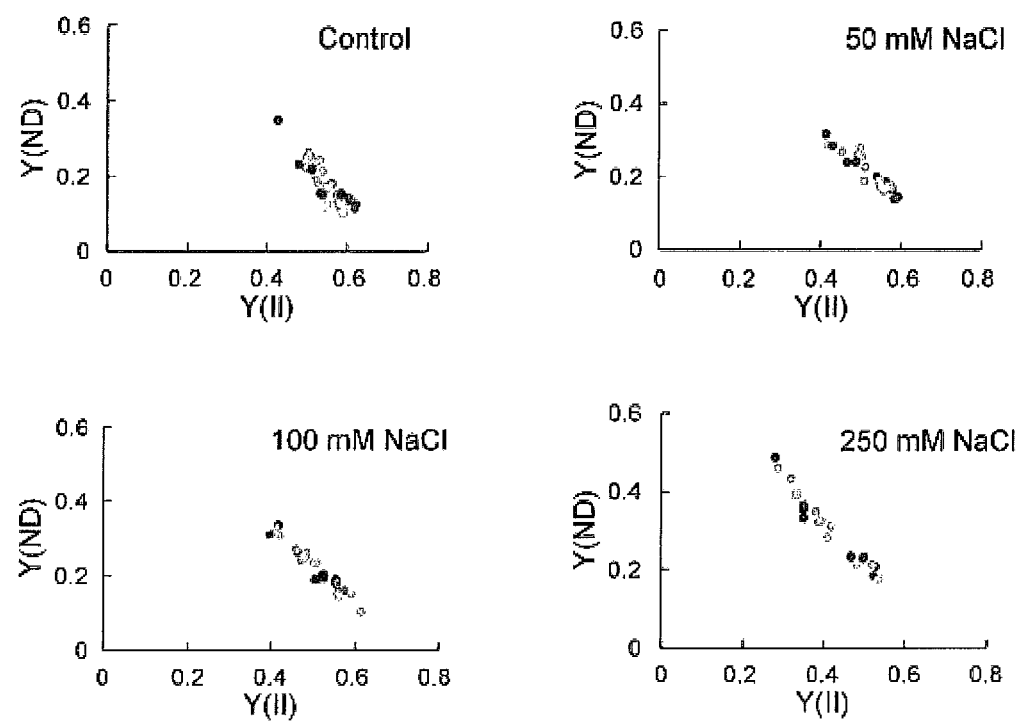
FIG. 21 shows correlative relationships between Y(ND) and Y(II) in pots in which NaCl concentration is controlled and pots each having been subjected to NaCl treatment.

FIG. 21 shows relationships between Y(ND) and Y(II) in the pots in which the NaCl concentration is controlled and the pots each having been subjected to NaCl treatment. As shown in FIG. 21, it is understood that the value of Y(ND) and the value of Y(II) are inversely correlated. The inverse correlation as used herein means the relationship in which when one increases, the other decreases as described above. In addition, as the salt concentration was higher, fluctuations in the Y(ND)/Y(II) plot tended to increase in accordance with the number of treated days.

Figure 22:
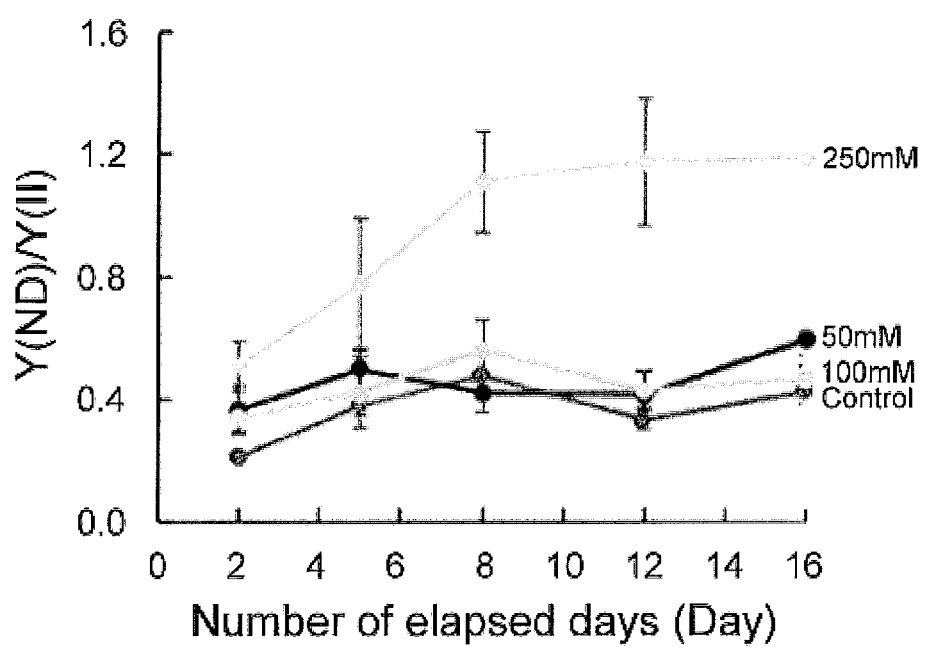
FIG. 22 shows transitions of Y(ND)/Y(II) in association with the number of elapsed days after salt stress treatment.

FIG. 22 shows transitions of Y(ND)/Y(II) in association with the number of elapsed days after the salt stress treatment. As shown in FIG. 22, by calculating the ratio of Y(ND)/Y(H), variation in the ROS marker relative to the salt stress can be detected more noticeably. In other words, the environmental stress diagnosis device according to the present modification can diagnose the presence/absence of salt stress by calculating Y(ND)/Y(II) by the analysis circuit 20a and utilizing this numeric value of Y(ND)/Y(II).

Figure 23:
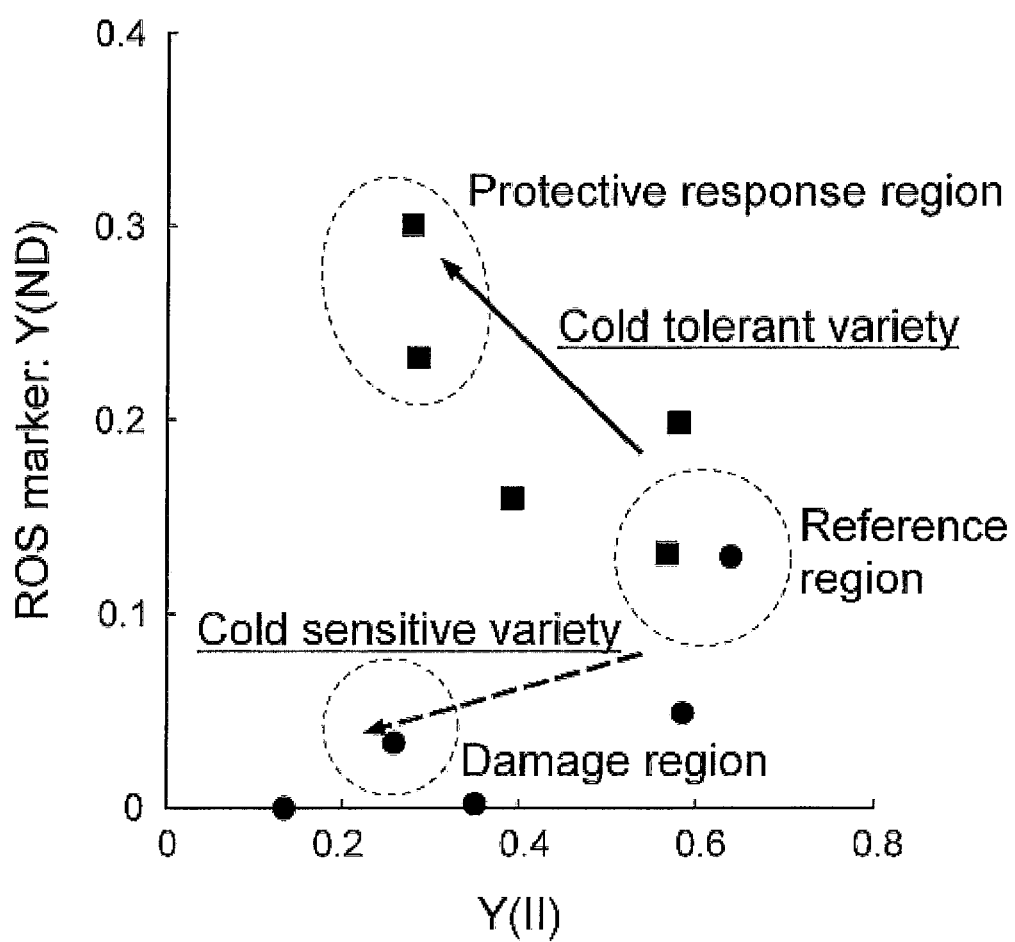
FIG. 23 shows a comparative image diagram (a correlation analysis graph) of a cold tolerant variety and a cold sensitive variety in the correlation between the ROS marker and the photosynthesis rate.

Note that the correlative relationship between the ROS marker and Y(H) measured in the present modification has a relationship similar to the correlative relationship between the ROS marker and V(O2) shown in FIG. 11. In other words, as shown in FIG. 23, in a case of assuming that a region in which a plant sample which is not subject to environmental stress is plotted is the reference region on the correlation measurement graph, a plant sample (the cold tolerant variety) which is subject to environmental stress and exhibits the normal protective response under the environmental stress is plotted in a region (called the protective response region) in which the numeric value of Y(H) is lower and the numeric value of the ROS marker is higher than in the reference region.

On the other hand, a plant sample which is subject to environmental stress but does not exhibit the normal protective response even under the environmental stress (the cold sensitive variety or a plant having been exposed to environmental stress for a long time and became unable to make the normal protective response) is plotted in a region (called the damage region) in which the numeric value of Y(II) is lower and the numeric value of the ROS marker is lower than in the reference region.

Further, the present embodiment (and the modification) can diagnose environmental stress in plants by utilizing the numeric value of Y(ND) which is the ROS marker, for example, without depending on the correlative relationship with V(O2) or Y(II) as described above. Specifically, the present embodiment (and the modification) can diagnose that a plant sample is not subject to environmental stress in a case in which the numeric value of the ROS marker is 0.1 to 0.3 or lower, and more preferably, the numeric value of the ROS marker is 0.1 or lower or 0.2 or lower, for example.

Figure 24:
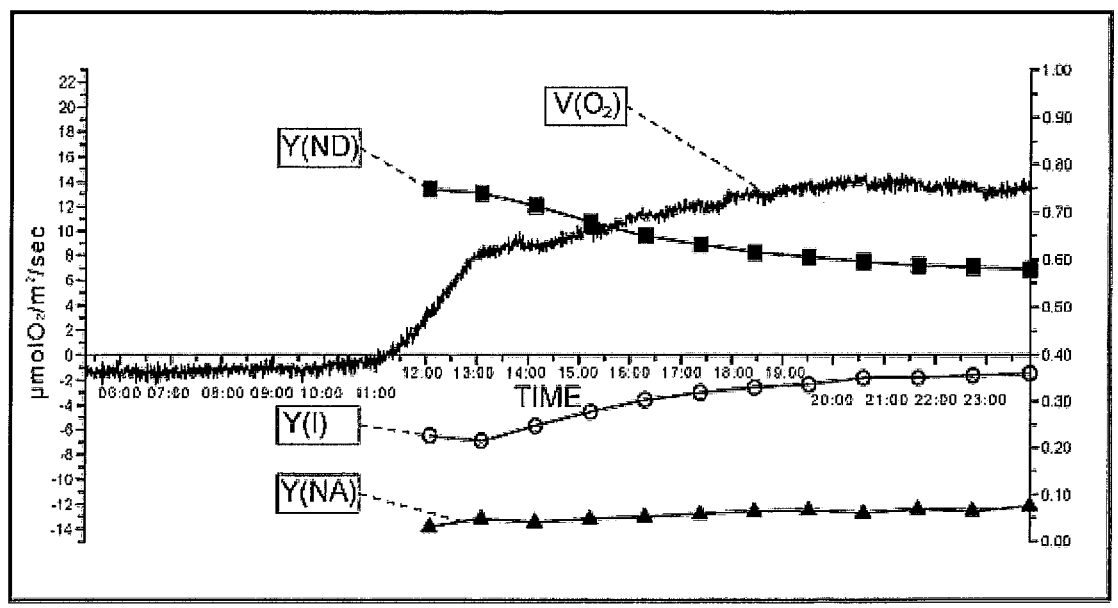
FIG. 24 shows a measurement example of Y(ND), Y(I), Y(NA), and V(O2).

In addition, the environmental stress diagnosis device 10 according to the present embodiment calculates the ROS marker and the oxygen production rate (or the photosynthesis rate), but can also calculate Y(I) and Y(NA) together with Y(ND) and the oxygen production rate V(O2) as shown in FIG. 24, for example. By combining these other parameters, an optimum analysis (environmental stress diagnosis) can be performed.

REFERENCE SIGNS LIST

10: Environmental stress diagnosis device
12: Measurement light source
14: Induction light source
16: sealed chamber
18: transmitted light detector
20: control unit
20a: Analysis circuit
20b: Control circuit
22: Oxygen concentration detector
24: Environment sensor
30a: Exhaled air introduction port
30b: Air output port
40: Fluorescence detector
ML: Measurement light
ML1: First measurement light
ML2: Second measurement light
PL: Photosynthesis inducing light
FR: First photosynthesis inducing light
AL: Second photosynthesis inducing light
TL: Composite rectangular wave transmitted light
TL1: First transmitted light
TL2: Second transmitted light

The invention claimed is:

1. An environmental stress diagnosis device that diagnoses an environmental stress state of a plant sample, comprising: a measurement light source that radiates a measurement light to the plant sample; an induction light source that radiates a photosynthesis inducing light to the plant sample; a sealed chamber that stores the plant sample and allows entry of the measurement light and the photosynthesis inducing light; a transmitted light detector that detects the measurement light transmitted through the plant sample as a transmitted light; and a control unit that receives the transmitted light detected by the transmitted light detector as a measurement signal, wherein the measurement light source radiates two types of a first measurement light and a second measurement light having different wavelengths to the plant sample, the induction light source radiates two types of a first photosynthesis inducing light and a second photosynthesis inducing light having different wavelengths to the plant sample, the transmitted light detector detects a transmitted light of the first measurement light as a first transmitted light and detects a transmitted light of the second measurement light as a second transmitted light, the control unit has a control circuit that controls the measurement light source and the induction light source in correspondence to the plant sample, and an analysis circuit that analyzes a detection result acquired by the transmitted light detector, the analysis circuit calculates a light absorption difference between the first transmitted light and the second transmitted light, and calculates Y(ND) which is a state in which P700 in photosystem I has been oxidized in photosynthesis as a ROS marker which is a reactive oxygen species suppression index for a plant by utilizing the light absorption difference, and the analysis circuit further diagnoses the environmental stress state of the plant sample by utilizing the ROS marker.

2. The environmental stress diagnosis device according to claim 1, wherein:

the sealed chamber is equipped with an oxygen concentration detector that measures an oxygen production rate of the plant sample inside the sealed chamber, and the analysis circuit diagnoses the environmental stress state of the plant sample by utilizing a correlation between the ROS marker and the oxygen production rate.

3. The environmental stress diagnosis device according to claim 2, wherein:

the analysis circuit creates a correlation analysis graph in which a correlation between an oxygen production rate and the ROS marker in the plant sample is plotted with the oxygen production rate on a horizontal axis and the ROS marker on a vertical axis, on the correlation analysis graph, in a case of assuming a region in which a plant sample which is not subject to environmental stress is plotted is a reference region on the correlation analysis graph, a plant sample which is subject to environmental stress and exhibits a normal protective response under the environmental stress is plotted in a protective response region which is a region in which a numeric value of the oxygen production rate is lower and a numeric value of the ROS marker is higher than in the reference region, and a plant sample which is subject to environmental stress but does not exhibit the normal protective response even under the environmental stress is plotted in a damage region which is a region in which the numeric value of the oxygen production rate is lower and the numeric value of the ROS marker is lower than in the reference region, and the analysis circuit determines whether a plot position of the plant sample belongs to the reference region, the protective response region, or the damage region in the correlation analysis graph, and diagnoses the environmental stress state of the plant sample.

4. The environmental stress diagnosis device according to claim 2, wherein:

the sealed chamber is equipped with all or any of a temperature sensor, a humidity sensor, and an atmospheric pressure sensor as an environment sensor, and the analysis circuit performs correction processing on the oxygen production rate detected by the oxygen concentration detector based on a detection result acquired by the environment sensor.

5. The environmental stress diagnosis device according to claim 2, wherein:

the oxygen concentration detector is a galvanic cell type oxygen concentration detector.

6. The environmental stress diagnosis device according to claim 1, further equipped with a fluorescence detector that detects chlorophyll fluorescence from the plant sample, wherein:

the analysis circuit calculates Y(II) as a photosynthesis rate from a chlorophyll fluorescence detection result acquired by the fluorescence detector, and the analysis circuit diagnoses the environmental stress state of the plant sample by utilizing a correlation between the ROS marker and the Y(II).

7. The environmental stress diagnosis device according to claim 6, wherein:

the correlation between the ROS marker and the Y(II) is an inverse correlation in which the ROS marker increases when the Y(II) decreases, and drying stress or salt stress in a plant is diagnosed by utilizing the inverse correlation.

8. The environmental stress diagnosis device according to claim 6, wherein:

the analysis circuit creates a correlation analysis graph in which the correlation between the Y(II) and the ROS marker in the plant sample is plotted with the Y(II) on a horizontal axis and the ROS marker on a vertical axis, on the correlation analysis graph, in a case of assuming a region in which a plant sample which is not subject to environmental stress is plotted is a reference region on the correlation analysis graph, a plant sample which is subject to environmental stress and exhibits a normal protective response under the environmental stress is plotted in a protective response region which is a region in which a numeric value of the Y(II) is lower and the numeric value of the ROS marker is higher than in the reference region, and a plant sample which is subject to environmental stress but does not exhibit the normal protective response even under the environmental stress is plotted in a damage region which is a region in which the numeric value of the Y(II) is lower and the numeric value of the ROS marker is lower than in the reference region, and the analysis circuit determines whether a plot position of the plant sample belongs to the reference region, the protective response region, or the damage region in the correlation analysis graph, and diagnoses the environmental stress state of the plant sample.

9. The environmental stress diagnosis device according to claim 1, wherein:

the induction light source performs stationary radiation with the first photosynthesis inducing light as continuous radiation, performs pulse radiation with the first photosynthesis inducing light as higher power radiation than the stationary radiation without providing a pausing period after the stationary radiation, thereafter provides a pausing period, performs stationary radiation with the second photosynthesis inducing light, and performs pulse radiation with the second photosynthesis inducing light without providing a pausing period after the stationary radiation, and a radiation time of the pulse radiation is 1 ms to 300 ms.

10. The environmental stress diagnosis device according to claim 1, wherein:

the sealed chamber is equipped with an exhaled air introduction port for externally introducing exhaled air and an air output port for replacing air inside the sealed chamber.

11. The environmental stress diagnosis device according to claim 1, wherein:

the environmental stress diagnosis device is operated by utilizing a communication terminal, and an environmental stress diagnosis result is displayed by the communication terminal.

12. An environmental stress diagnosis method for a plant, comprising the steps of:

storing a plant sample in a sealed chamber, radiating a first measurement light and a second measurement light from a measurement light source to the plant sample, and radiating a first photosynthesis inducing light and a second photosynthesis inducing light from an induction light source to the plant sample;

detecting, by a transmitted light detector, the first measurement light and the second measurement light transmitted through the plant sample as a first transmitted light and a second transmitted light, respectively;

calculating, by an analysis circuit, a light absorption difference between the first transmitted light and the second transmitted light by an analysis circuit, and calculating, by the analysis circuit, Y(ND) which is a state in which P700 in photosystem I has been oxidized in photosynthesis as a ROS marker which is a reactive oxygen species suppression index for a plant utilizing the light absorption difference; and diagnosing an environmental stress state of the plant by utilizing the ROS marker.

* * * * *